United States Patent
Khankal et al.

(10) Patent No.: US 12,528,999 B2
(45) Date of Patent: Jan. 20, 2026

(54) SUSTAINABLE JET FUEL AND PROCESS

(71) Applicant: Chevron Phillips Chemical Company LP, The Woodlands, TX (US)

(72) Inventors: Reza Khankal, Bellaire, TX (US); Michael S. Webster-Gardiner, Humble, TX (US); James Hillier, Kingwood, TX (US); Jared Fern, Kingwood, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 78 days.

(21) Appl. No.: 18/462,567

(22) Filed: Sep. 7, 2023

(65) Prior Publication Data

US 2025/0084327 A1    Mar. 13, 2025

(51) Int. Cl.
| | | |
|---|---|---|
| *C10L 1/02* | (2006.01) | |
| *B01J 31/02* | (2006.01) | |
| *B01J 31/14* | (2006.01) | |
| *B01J 31/34* | (2006.01) | |
| *C07C 2/32* | (2006.01) | |
| *C07C 2/36* | (2006.01) | |
| *C07C 5/03* | (2006.01) | |

(52) U.S. Cl.
CPC .......... *C10L 1/023* (2013.01); *B01J 31/0267* (2013.01); *B01J 31/143* (2013.01); *B01J 31/34* (2013.01); *C07C 2/32* (2013.01); *C07C 2/36* (2013.01); *C07C 5/03* (2013.01); *B01J 2231/20* (2013.01); *C10L 2270/04* (2013.01)

(58) Field of Classification Search
None
See application file for complete search history.

(56) References Cited

U.S. PATENT DOCUMENTS

| | | | |
|---|---|---|---|
| 2,882,244 A | 4/1959 | Milton | |
| 3,130,007 A | 4/1964 | Breck | |
| 3,216,789 A | 11/1965 | Breck | |
| 4,021,447 A | 5/1977 | Rubin | |
| 4,503,023 A | 3/1985 | Breck | |
| 6,190,539 B1 | 2/2001 | Holtermann | |
| 6,291,733 B1 | 9/2001 | Small | |
| 6,812,180 B2 | 11/2004 | Fukunaga | |
| 6,914,165 B2 | 7/2005 | Flego | |
| 7,153,801 B2 | 12/2006 | Wu | |
| 7,902,105 B2 | 3/2011 | Khare | |
| 8,334,420 B2 | 12/2012 | Small | |
| 8,680,003 B2 | 3/2014 | Sydora | |
| 8,791,217 B2 | 7/2014 | Hlavinka | |
| 8,969,640 B2 | 3/2015 | Blommel | |
| 9,115,225 B2 | 8/2015 | Hlavinka | |
| 9,175,109 B1 | 11/2015 | Kreischer | |
| 9,352,309 B2 | 5/2016 | Sydora | |
| 9,567,541 B2 | 2/2017 | Frey | |
| 9,708,549 B2 | 7/2017 | Gee | |
| 9,745,230 B2 | 8/2017 | Small | |
| 9,862,655 B2 | 1/2018 | Fichtl | |
| 9,879,192 B2 | 1/2018 | Watermeyer De Wet | |
| 9,914,672 B2 | 3/2018 | Greene | |
| 9,957,449 B2 * | 5/2018 | Luebke | C10L 1/04 |
| 9,967,449 B2 | 5/2018 | Luebke | |
| 9,968,921 B2 | 5/2018 | Kilgore | |
| 10,113,130 B1 | 10/2018 | Harvey | |
| 10,183,899 B2 | 1/2019 | Bischof | |
| 10,240,102 B2 | 3/2019 | Small | |
| 10,329,212 B2 | 6/2019 | Fern | |
| 10,414,698 B2 | 9/2019 | Fern | |
| 10,435,334 B2 | 10/2019 | Bischof | |
| 10,435,336 B2 | 10/2019 | Kreischer | |
| 10,544,070 B2 | 1/2020 | Small | |
| 10,577,291 B2 | 3/2020 | Frey | |
| 10,647,931 B2 | 5/2020 | Pucci | |
| 10,793,781 B2 | 10/2020 | Hakola | |
| 10,920,151 B2 | 2/2021 | Brandvold | |

(Continued)

FOREIGN PATENT DOCUMENTS

| | | |
|---|---|---|
| WO | 2002004575 | 1/2002 |
| WO | 2018071905 A1 | 4/2018 |

OTHER PUBLICATIONS

International Search Report and Written Opinion issued in corresponding PCT Application No. PCT/US2024/045290, mailed on Dec. 20, 2024, 16 pages.
International Search Report and Written Opinion issued in corresponding PCT Application No. PCT/US2024/045299, mailed on Feb. 3, 2025, 24 pages.
Babu B Hari et al: "An integrated process for production of jet-fuel range olefins from ethylene using Ni-AISBA-15 and Amberlyst-35 catalysts", Applied Catalysis A: General, vol. 530, 2017, pp. 48-55.
ISCC Certification for Sustainable Aviation Fuels.
Small, B., Insights on the Mechanism for Ethylene Tetramerization, Organometallics, DOI: 10.1021/acs.organomet.2c00285.
Sustainable Aviation Fuel: Review of Technical Pathways.

(Continued)

*Primary Examiner* — Ali Z Fadhel
(74) *Attorney, Agent, or Firm* — Merchant & Gould P.C.

(57) ABSTRACT

Described are new processes for making sustainable jet fuels and components thereof, based upon generating bio-ethylene by dehydration of biomass ethanol or a bio-syngas ethanol, and subsequently employing a tailored selection of oligomerization, cyclization, and hydrogenation reactions to generate each class of compounds which can be used as components in a sustainable aviation fuel. For example bio-ethylene oligomerization can provide olefin oligomers which can be hydrogenated to linear and branched paraffins, these paraffins can be cyclized to form bio-sourced aromatic compounds which subsequently can be hydrogenated to form cycloparaffins or naphthenes. These compounds can be blended to provide sustainable products in the kerosene jet fuel range ($C_8$-$C_{16}$) or wide-cut jet fuel range ($C_5$-$C_{15}$ or $C_4$-$C_{16}$).

36 Claims, No Drawings

(56) References Cited

U.S. PATENT DOCUMENTS

| | | |
|---|---|---|
| 10,927,052 B2 | 2/2021 | Coffin |
| 11,072,569 B2 | 7/2021 | Bischof |
| 11,078,433 B2 | 8/2021 | Smith |
| 11,312,671 B2 | 4/2022 | Barias |
| 11,358,914 B2 | 6/2022 | Bischof |
| 11,639,320 B1 | 5/2023 | Chang |
| 2009/0158637 A1 | 6/2009 | Mccall |
| 2009/0250376 A1 | 10/2009 | Brandvold |
| 2012/0197053 A1* | 8/2012 | Cantrell .................... C10L 1/04 585/329 |
| 2012/0209045 A1 | 8/2012 | Wright |
| 2014/0051898 A1 | 2/2014 | Wright |
| 2016/0194257 A1 | 7/2016 | Lilga |
| 2016/0194572 A1* | 7/2016 | Lilga ......................... C07C 2/24 585/277 |
| 2018/0065115 A1 | 3/2018 | Alvez-Manoli |
| 2021/0009911 A1 | 1/2021 | Medoff |
| 2021/0355047 A1 | 11/2021 | Li |
| 2022/0396534 A1 | 12/2022 | Vincent |
| 2022/0396741 A1 | 12/2022 | Vincent |
| 2023/0313048 A1* | 10/2023 | Jan .......................... C10G 57/02 585/17 |
| 2024/0246887 A1* | 7/2024 | Mathur ................. C10G 69/126 |

OTHER PUBLICATIONS

Toxicological Profile for Jet Fuels JP-4 and JP-7, U.S. Department of Health and Human Services, Agency for Toxic Substances and Disease Registry, Jun. 1995.

International Search Report and Written Opinion issued in corresponding PCT Application No. PCT/US2025/042160, mailed on Nov. 21, 2025, 13 pp.

Liu et al., "Experimental and numberical analysis on flow characteristics and pyrolysis mechanism of hydrocarbon fuel with a novel online hybred method," ScienceDirect, Energy Conversion and Management, 198 (2019) 111817, 14 pp.

Gao et al.," Novel measurement of isobaric specific heat capacity for kerosene RP-3 at high temperature and high pressure," ScienceDirect, Thermochimica Acta 638 (2016) pp. 113-119.

\* cited by examiner

SUSTAINABLE JET FUEL AND PROCESS

CROSS REFERENCE TO RELATED APPLICATIONS

None.

TECHNICAL FIELD

This disclosure relates to the production of sustainable aviation fuels, particularly sustainable jet fuel from bio-ethylene derived from a biomass ethanol or a bio-syngas ethanol.

BACKGROUND OF THE DISCLOSURE

Although the jet fuel market is smaller than the gasoline and diesel fuel markets, it still constitutes some 25% of the total transportation fuel consumption and currently exceeds 26 billion gallons per year in the U.S. alone. Market growth in jet fuels is expected to approximately double over the next 20 years, while the gasoline markets are expected to decline over this time. Therefore, maintaining a robust jet fuel production and transportation infrastructure, and developing improved processes for producing jet and aviation fuels are becoming increasingly important.

Sustainable aviation fuels (SAF) may offer the needed resilience to meet these future needs in terms of feedstock availability, while addressing the need to reduce emissions. For example, SAF may provide a substantial reduction of greenhouse gas emissions with little or no changes to current engine technology, SAF may also provide a drop-in fuel solution. Drop-in fuels can allow current aircraft to use a 50 percent blend of SAF and Jet A with no engine or other modifications. SAF production facilities also may be located near the airports they service, which may also improve fuel transport issues for jet fuels. Therefore, many companies have set SAF use goals as a primary strategy to attain net-zero emissions.

However, challenges to the large scale production and use of SAF remain. While SAF provide an environmentally sustainable technology, current technologies to produce SAF are not yet economically viable. For example, SAF may cost four to five times as much as conventional jet fuel, and currently makes up less than one percent of fuel available in the market. Therefore, there remains a need for processes for making sustainable jet fuels which may improve the technology, and enhance the production economics, and which may provide additional benefits or efficiencies to address the rapidly growing need for jet fuel.

SUMMARY OF THE DISCLOSURE

Aviation fuels and specifically jet fuels contain primarily saturated hydrocarbon compounds, including linear and branched alkanes (paraffins), and cycloalkanes (cycloparaffins or naphthenes), with smaller concentrations of aromatic compounds and olefins. The high hydrogen-to-carbon ratio of the paraffins provides a high heat release per unit weight and a relatively cleaner burn than other hydrocarbons, while cycloparaffins provide less heat release per unit of weight but increase the fuel's density. Paraffins and cycloparaffins also beneficially reduce the freezing point of the fuel.

Aromatic hydrocarbons and olefins are also present in aviation fuels and their reactivity and burn properties have required restrictions on their maximum concentration levels. Conventional additives also present in jet fuel may include antioxidants, metal deactivators, fuel system icing inhibitors, corrosion inhibitors, static dissipator additives, and the like, and these are also present in limited quantities in jet fuels in order to improve performance. Typically, some small amounts non-hydrocarbon compounds are present in jet and aviation fuels, such as heteroatom-containing compounds.

Even though the composition of aviation fuels established by the U.S. Air Force is based primarily on fuel specifications which provide the maximum performance for specific aircraft, this performance results from the chemical composition of the complex hydrocarbon blend. For example, JP-4 jet fuel is a wide-cut fuel because it is produced from a broad distillation temperature range and contains a wide array of carbon chain-lengths, from 4 to 16 carbons long. The approximate composition of JP-4 is about 86 vol. % saturated hydrocarbons, about 13 vol. % (v/v) aromatic hydrocarbons, about 1 vol. % olefins, and JP-4 has a distillation range of about 60° C. to 270° C. See: *Toxicological Profile for Jet Fuels JP-4 and JP-7*; U.S. Department of Health and Human Services, Agency for Toxic Substances and Disease Registry; June 1995.

In an aspect, this disclosure provides new processes for making sustainable jet fuels and components of sustainable jet fuels, based upon generating bio-ethylene by dehydration of biomass ethanol or a bio-syngas ethanol, and subsequently employing a tailored selection of oligomerization, cyclization, and hydrogenation reactions to generate each class of compounds which can be used as components in a sustainable aviation fuel. Because highly selectivity processes to produce these jet fuel components are neither necessary or desirable, the proper selection of reaction sequences can generate desirable compound mixtures of each jet fuel compound class with few or no separation steps. For example, the tailored reaction selection of bio-ethylene oligomerization can provide olefin oligomers which can be hydrogenated to linear and branched paraffins, the major components of jet fuels. These paraffins and olefin oligomers can be cyclized to form bio-sourced benzene, toluene, xylenes, and other substituted benzenes as jet fuel components. Moreover, these aromatic compounds and mixtures of compounds subsequently can be hydrogenated to form cycloparaffins or naphthenes, which are used in substantial concentrations in jet fuel. The processes described herein can be used to produce products in the kerosene jet fuel range ($C_8$-$C_{16}$) or wide-cut jet fuel range ($C_5$-$C_{15}$ or $C_4$-$C_{16}$).

Accordingly, in one aspect, the disclosed process takes advantage of a catalytic oligomerization of bio-ethylene to form $C_4$-$C_{16}$ alpha-olefins, followed by a second catalytic oligomerization of the $C_4$-$C_{16}$ alpha-olefin product to form a $C_{16-}$ olefin stream, which subsequently may be hydrogenated to form a desirable $C_{16-}$ paraffin stream. Depending upon the desired jet fuel composition, the $C_{16-}$ paraffin stream, the $C_{16-}$ olefin stream, the $C_4$-$C_{16}$ alpha-olefins, or any combinations thereof can be utilized as components for a sustainable jet fuel. By describing the catalytic oligomerization of bio-ethylene as forming $C_4$-$C_{16}$ alpha-olefins, it is intended to reflect that the process produces at least one alpha-olefin within the $C_4$-$C_{16}$ range, even though a particular population or distribution of alpha-olefins is formed depending upon the catalyst and the conditions.

In a further aspect, the disclosed process also takes advantage of a catalytic oligomerization of bio-ethylene to form $C_4$-$C_{16}$ alpha-olefins as described above, from which a $C_6$ to $C_8$ aliphatic hydrocarbon stream comprising $C_6$ to $C_8$ alpha-olefins and paraffins can be separated. This $C_6$ to $C_8$ aliphatic hydrocarbon stream may then be contacted with a reforming catalyst or an AROMAX® catalyst to provide a $C_6$ to $C_8$ aromatic hydrocarbon stream comprising a mixture of aromatic compounds. The $C_6$ to $C_8$ aromatic hydrocarbon stream may subsequently be hydrogenated under catalytic hydrogenation conditions, providing a $C_6$ to $C_8$ cycloparaffin stream. Depending upon the desired jet fuel composition, the $C_6$ to $C_8$ aromatic hydrocarbon stream, the $C_6$ to $C_8$ cycloparaffin stream, or a combination thereof can be utilized as components for a sustainable jet fuel.

By these tailored and varied sequences involving oligomerization, separation, cyclization, and hydrogenation reactions, each class of jet fuel compound classes can be generated from bio-ethylene sources, and any or any combination of the aforementioned $C_{16}$-paraffin stream, the $C_{16}$-olefin stream, the $C_4$-$C_{16}$ alpha-olefins, the $C_6$ to $C_8$ aromatic hydrocarbon stream, the $C_6$ to $C_8$ cycloparaffin stream can be used as blend stock components for a sustainable jet fuel.

According to another aspect of the disclosure, the processes described above may be integrated into larger process schemes which can take full advantage of each step, each product, and each byproduct to achieve even broader advantage and efficiency. For example, also described is an integrated process that can utilize a catalytic oligomerization of bio-ethylene to form $C_4$-$C_{16}$ alpha-olefins as described above, from which a $C_6$ to $C_8$ aliphatic hydrocarbon stream comprising $C_6$ to $C_8$ alpha-olefins and paraffins can be separated, and thereby providing a providing a $C_4$ and $C_{10}$-$C_{12}$ alpha-olefin raffinate. The $C_6$ to $C_8$ aliphatic hydrocarbon stream may be contacted with a reforming catalyst or an AROMAX® catalyst as described above to provide a $C_6$ to $C_8$ aromatic hydrocarbon stream comprising a mixture of aromatic compounds, all or a portion of which may subsequently be hydrogenated under catalytic hydrogenation conditions, to provide a $C_6$ to $C_8$ cycloparaffin stream. The $C_4$ and $C_{10}$-$C_{12}$ alpha-olefin raffinate may then be contacted with a second oligomerization catalyst system to provide a $C_{16-}$ olefin stream, all or a portion of which can be hydrogenated under catalytic hydrogenation conditions to provide a $C_{16-}$ paraffin stream. In this example of a more integrated process, the $C_6$ to $C_8$ aliphatic hydrocarbon stream, the $C_6$ to $C_8$ aromatic hydrocarbon stream, the $C_6$ to $C_8$ cycloparaffin stream, the $C_{16-}$ olefin stream, the $C_{16-}$ paraffin stream, any fractions thereof, and any combinations thereof may be used as components to form a sustainable jet fuel.

If desired, the sustainable jet fuel or any component thereof prepared as described herein can be used as-is, that is, it can be used without further purification. In another aspect, the sustainable aviation fuel or a component thereof prepared as described can be used following further purification by any method. Suitable purifications may be designed to remove contaminants such as sulfur compounds or may be used to fractionate the sustainable jet fuel or component thereof to select a higher or lower boiling fraction thereof. In a further aspect, the sustainable aviation fuel or the component thereof can be blended with a non-sustainable aviation or jet fuel or can be blended with any components of a non-sustainable aviation or jet fuel.

In the disclosed processes for making a sustainable aviation or jet fuel, the step of providing a bio-ethylene feed can include: [1] converting a starch-based feedstock, a sugar-based feedstock, or a cellulosic feedstock to a biomass ethanol; and [2] dehydrating the biomass ethanol to provide a bio-ethylene feed. In the processes described herein, all or only a portion of the bio-ethylene feed used in the process can be derived from the dehydration of biomass ethanol.

Therefore, in an aspect, the sustainable aviation or jet fuel provided herein can be certified as compliant with the Carbon Offsetting and Reduction Scheme for International Aviation (CORSIA) sustainability criteria in accordance with the International Sustainability and Carbon Certification (ISCC) CORSIA certification system. In another aspect, the sustainable aviation or jet fuel can be certified as a Lower Carbon Aviation Fuel (LCAF) in accordance with the International Sustainability and Carbon Certification (ISCC) LCAF certification system. In either aspect, the certification can be based upon the weight or fraction of the sustainable aviation fuel attributable to the biomass ethanol determined by mass balance and the free attribution method.

These and other embodiments, aspects, and improvements of the processes, methods, and compositions are described more fully in the Detailed Description and the further disclosure such as the Examples and the numbered Aspects provided herein and in the appended claims.

DETAILED DESCRIPTION OF THE DISCLOSURE

This disclosure describes a process for making a sustainable aviation or jet fuel which is based upon generating bio-ethylene by dehydration of biomass ethanol or a bio-syngas ethanol, and subsequently oligomerizing the bio-ethylene to normal alpha-olefins which are further processes to form sustainable jet fuel or components of sustainable jet fuel. For example, olefin oligomers can be hydrogenated to paraffins or the olefin oligomers can be cyclized to aromatic compounds which can be hydrogenated to cycloparaffins, and all of the compounds can be blended in desired proportions depending upon the target properties of the jet fuel. All of the sustainable jet fuel components prepared according to this disclosure also may be blended with non-sustainable jet fuel components in forming the final jet fuel. The processes described herein can be used to for making jet fuels in the kerosene jet fuel range ($C_8$-$C_{16}$) or wide-cut jet fuel range ($C_5$-$C_{15}$ or $C_4$-$C_{16}$), depending upon the specific selection of oligomerization, cyclization, hydrogenation, and other reactions used to generate sustainable aviation fuel or component thereof and the blending selections.

One significant advantage of using a targeted sequence of catalytic processes for making the subject jet fuels or jet fuel components is that high selectivity which is normally desirable in chemical synthesis processes is neither necessary nor particularly desirable in making jet fuels. The large number of compounds which normally make up jet fuel include numerous linear alkanes (paraffins), branched or iso-alkanes (iso-paraffins), naphthenes (cycloparaffins), benzene and substituted benzenes and other aromatics, and even olefins. It is this complex blend and the relative proportions of compound types that impart many of the advantageous properties to fuel. For example, volatility over a range of temperatures, flash point, specific gravity, vapor pressure, viscosity, freezing point, heat of combustion, smoke point, hydrogen content, contaminants, and the like may all be customized by the composition of the blend. To illustrate the complexity of aviation fuels, Table 1 below illustrates a typical hydrocarbon composition of JP-4 fuel, as adapted from *Toxicological Profile for Jet Fuels JP-4 and JP-7*; U.S. Department of Health and Human Services, Agency for Toxic Substances and Disease Registry; June 1995; and Smith J. H., Harper J. C., and Jaber H. 1981, Analysis and environmental fate of airforce distillate and high density fuels, Engineering and Services Laboratory, Air Force Engineering and Services Center, Tyndall Air Force Base, FL, ESL-TR-81-54.

TABLE 1

Exemplary major hydrocarbon composition of JP-4 fuel, with concentrations in weight percent

| n-Alkanes | Wt. % | Cycloparaffins | Wt. % |
|---|---|---|---|
| Butane | 0.12 | Methylcyclopentane | 1.16 |
| Pentane | 1.06 | Cyclohexane | 1.24 |
| Hexane | 2.21 | t-1,3,-Dimethylcyclopentane | 0.36 |
| Heptane | 3.67 | c-1,3,-Dimethylcyclopentane | 0.34 |
| Octane | 3.80 | c-1,2-Dimethylcyclopentane | 0.54 |
| Nonane | 2.25 | Methylcyclohexane | 2.27 |
| Decane | 2.16 | Ethylcyclopentane | 0.26 |
| Undecane | 2.32 | 1,2,4-Trimethylcyclopentane | 0.25 |
| Dodecane | 2.00 | 1,2,3-Trimethylcyclopentane | 0.25 |
| Tridecane | 1.52 | c-1,3-Dimethylcyclohexane | 0.42 |
| Tetradecane | 0.73 | 1-Methyl-3-ethylcyclohexane | 0.17 |
| iso-Alkanes | Wt. % | 1-Methyl-2-ethylcyclohexane | 0.39 |
| Isobutane | 0.66 | Dimethylcyclohexane | 0.43 |
| 2,2-Dimethylbutane | 0.10 | 1,3,5-Trimethylcyclohexane | 0.99 |
| 2-Methylpentane | 1.28 | 1,1,3-Trimethylcyclohexane | 0.48 |
| 3-Methylpentane | 0.89 | 1-Methyl-4-ethylcyclohexane | 0.48 |
| 2,2-Dimethylpentane | 0.25 | n-Butylcyclohexane | 0.70 |
| 2-Methylhexane | 2.35 | Aromatic Hydrocarbons | Wt. % |
| 3-Methylhexane | 1.97 | Benzene | 0.50 |
| 2,2,3,3-Tetramethylbutane | 0.24 | Toluene | 1.33 |
| 2,5-Dimethylhexane | 0.37 | Ethylbenzene | 0.37 |
| 2,4-Dimethylhexane | 0.58 | m-Xylene | 0.96 |
| 3,3-Dimethylhexane | 0.26 | p-Xylene | 0.35 |
| 2,2-Dimethylhexane | 0.71 | o-Xylene | 1.01 |
| 2-Methylheptane | 2.70 | Isopropylbenzene | 0.30 |
| 4-Methylheptane | 0.92 | n-Propylbenzene | 0.71 |
| 3-Methylheptane | 3.04 | 1-Methyl-3-ethylbenzene | 0.49 |
| 2,5-Dimethylheptane | 0.52 | 1-Methyl-4-ethylbenzene | 0.43 |
| 2,4-Dimethylheptane | 0.43 | 1,3,5-Trimethylbenzene | 0.42 |
| 4-Ethylheptane | 0.18 | 1-Methyl-2-ethylbenzene | 0.23 |
| 4-Methyloctane | 0.86 | 1,2,4-Trimethylbenzene | 1.01 |
| 2-Methyloctane | 0.88 | 1,3-Diethylbenzene | 0.46 |
| 3-Methyloctane | 0.79 | 1-Methyl-4-propylbenzene | 0.40 |
| 2-Methylundecane | 0.64 | 1,3-Dimethyl-5-ethylbenzene | 0.61 |
| 2,6-Dimethylundecane | 0.71 | 1-Methyl-2-isopropylbenzene | 0.29 |
| | | 1,4-Dimethyl-2-ethylbenzene | 0.70 |
| | | 1,2-Dimethyl-4-ethylbenzene | 0.77 |
| | | 1,2,3,4-Tetramethylbenzene | 0.75 |
| | | Naphthalene | 0.50 |
| | | 2-Methylnaphthalene | 0.56 |
| | | 1-Methylnaphthalene | 0.78 |
| | | 2,6-Dimethylnaphthalene | 0.25 |

Therefore, in one aspect this disclosure describes a process for making a sustainable jet fuel, in which the process can comprise: (a) providing a bio-ethylene feed, at least a portion of which is derived from a biomass ethanol or a bio-syngas ethanol; (b) contacting the bio-ethylene feed with a first oligomerization catalyst system to form a first oligomerization product comprising at least one $C_4$ to $C_{16}$ alpha-olefin; (c) contacting at least a first portion of the first oligomerization product with a second oligomerization catalyst system to provide a second oligomerization product comprising $C_{16-}$ olefins; and (d) hydrogenating the second oligomerization product in the presence of a first hydrogenation catalyst to provide a first $C_{16}$-paraffin stream. This basic process can further comprise a range of additional steps to provide greater efficiency and flexibility in producing sustainable jet fuels, as follows.

According to a further aspect, this process for making a sustainable jet fuel can further comprise: (i) separating a second portion of the first oligomerization product comprising at least one $C_8$ to $C_{16}$ alpha-olefin from the first oligomerization product, prior to contacting the first oligomerization product with the second oligomerization catalyst system. If desired, the process may further comprise (ii) combining the second portion of the first oligomerization product with the second oligomerization product prior to hydrogenating the second oligomerization product in the presence of a first hydrogenation catalyst; wherein hydrogenating the second oligomerization product comprises hydrogenating the combined first oligomerization product and second oligomerization product to provide the first $C_{16}$-paraffin stream.

Yet another aspect of the disclosure provides that this process for making a sustainable jet fuel can further comprise: (i) separating a second portion of the first oligomerization product comprising at least one $C_8$ to $C_{16}$ alpha-olefin from the first oligomerization product, prior to contacting the first oligomerization product with the second oligomerization catalyst system, and if desired, can further comprise (ii) hydrogenating the second portion of the first oligomerization product in the presence of a second hydrogenation catalyst to provide a second $C_{16-}$ paraffin stream. In a further aspect, this process can further comprise (iii) combining the first $C_{16}$- paraffin stream and the second $C_{16}$-paraffin stream. The first $C_{16}$- paraffin stream, the second $C_{16}$-paraffin stream, or the combined first and second $C_{16}$-paraffin streams can then be used as blend stock to form a sustainable jet fuel, in which any additional hydrocarbon blend components can be sustainable or non-sustainable.

As will be appreciated by the person of ordinary skill, the catalytic oligomerization of bio-ethylene is disclosed as forming at least one alpha-olefin within the $C_4$-$C_{16}$ range, which means a population of alpha-olefin oligomers, at least one of which is within this range. Therefore, descriptions such as an oligomerization product comprising $C_8$ to $C_{16}$ alpha-olefins or at least one $C_8$ to $C_{16}$ alpha-olefin, a $C_{16}$-olefin product or at least one $C_{16}$- olefin product, a $C_{16}$-paraffin product or at least one $C_{16}$- paraffin product, and the like are to viewed similarly to mean a population of alpha-olefin oligomers or paraffins, and the like, at least one of which is within the recited carbon range. In one aspect, most of the alpha-olefin oligomers or paraffins produced as described herein are within the recited range, and in another aspect, at least 60 mol %, at least 70 mol %, at least 80 mol %, or at least 90 mol % of the alpha-olefin oligomers or paraffins are within the recited range.

According to another aspect, in the disclosed processes for making a sustainable jet fuel, the at least one $C_4$ to $C_{16}$ alpha-olefin can comprise, consist essentially of, or be selected from $C_4$ to $C_{14}$ alpha-olefins, from $C_4$ to $C_{12}$ alpha-olefins, $C_6$ to $C_8$ alpha-olefins, $C_6$ plus $C_{10}$ alpha-olefins, $C_6$ to $C_{10}$ alpha-olefins, or any combination thereof. In a further aspect, for example, the recited $C_4$ to $C_{16}$ alpha-olefins can comprise some $C_{16+}$ alpha-olefins.

In the aspect disclosed above, the process for making a sustainable jet fuel can comprise: (a) providing a bio-ethylene feed, at least a portion of which is derived from a biomass ethanol or a bio-syngas ethanol; (b) contacting the bio-ethylene feed with a first oligomerization catalyst system to form a first oligomerization product comprising at least one $C_4$ to $C_{16}$ alpha-olefin; (c) contacting at least a first portion of the first oligomerization product with a second oligomerization catalyst system to provide a second oligomerization product comprising $C_{16-}$ olefins; and (d) hydrogenating the second oligomerization product in the presence of a first hydrogenation catalyst to provide a first $C_{16-}$ paraffin stream. This process can then further comprise: (i) separating a $C_6$ to $C_8$ aliphatic hydrocarbon stream comprising at least one $C_6$ to $C_8$ alpha-olefin and/or $C_6$ to $C_8$ paraffin from the first oligomerization product; (ii) contacting the $C_6$ to $C_8$ aliphatic hydrocarbon stream with a reforming catalyst to provide a $C_6$ to $C_8$ aromatic hydrocarbon stream; and (iii) hydrogenating at least a portion of the $C_6$ to $C_8$ aromatic hydrocarbon stream in the presence of a third hydrogenation catalyst to form a $C_6$ to $C_8$ cycloparaffin stream. The $C_6$ to $C_8$ cycloparaffin stream, the $C_6$ to $C_8$ aromatic hydrocarbon stream, or both can then be used as components to form a sustainable jet fuel. In a further aspect, the step (i) of separating the $C_6$ to $C_8$ aliphatic hydrocarbon stream from the first oligomerization product provides an alpha-olefin raffinate comprising at least one $C_4$ and $C_{10}$-$C_{16}$ alpha-olefin; and the step (c) of contacting at least the first portion of the first oligomerization product with the second oligomerization catalyst system comprises contacting the alpha-olefin raffinate with the second oligomerization catalyst system to provide the second oligomerization product comprising $C_{16-}$ olefins.

These processes also afford the ability to make a $C_6$ to $C_8$ aromatic hydrocarbon stream and a $C_6$ to $C_8$ cycloparaffin stream from a bio-ethylene feed as disclosed hereinabove and as follows. Thus in still another aspect, there is provided a process for making a sustainable jet fuel, the process comprising: (a) providing a bio-ethylene feed, at least a portion of which is derived from a biomass ethanol or a bio-syngas ethanol; (b) contacting the bio-ethylene feed with a first oligomerization catalyst system to form a first oligomerization product comprising at least one $C_4$ to $C_{16}$ alpha-olefin; (c) separating a $C_6$ to $C_8$ aliphatic hydrocarbon stream comprising at least one $C_6$ to $C_8$ alpha-olefin and/or $C_6$ to $C_8$ paraffin from the first oligomerization product; and (d) contacting the $C_6$ to $C_8$ aliphatic hydrocarbon stream with a reforming catalyst to provide a $C_6$ to $C_8$ aromatic hydrocarbon stream. This process may further comprise: (e) using the $C_6$ to $C_8$ aromatic hydrocarbon stream as a component to form a sustainable jet fuel.

A further aspect for example provides a process for making a sustainable jet fuel, the process comprising: (a) providing a bio-ethylene feed, at least a portion of which is derived from a biomass ethanol or a bio-syngas ethanol; (b) contacting the bio-ethylene feed with a first oligomerization catalyst system to form a first oligomerization product comprising at least one $C_4$ to $C_{16}$ alpha-olefin; (c) separating a $C_6$ to $C_8$ aliphatic hydrocarbon stream comprising at least one $C_6$ to $C_8$ alpha-olefin and/or $C_6$ to $C_8$ paraffin from the first oligomerization product; (d) contacting the $C_6$ to $C_8$ aliphatic hydrocarbon stream with a reforming catalyst to provide a $C_6$ to $C_8$ aromatic hydrocarbon stream; and (e) hydrogenating the $C_6$ to $C_8$ aromatic hydrocarbon stream in the presence of a third hydrogenation catalyst to form a $C_6$ to $C_8$ cycloparaffin stream. This process than may further comprise: (f) using the $C_6$ to $C_8$ cycloparaffin stream as a component to form a sustainable jet fuel.

As understood by the skilled artisan, the flexibility of the disclosed processes allows the integration of multiple steps for oligomerization, separation, reforming, hydrogenation and the like which can generate a range of useful sustainable jet fuel blends and blend stock. In an aspect, for example, the process for making a sustainable jet fuel can comprise: (a) providing a bio-ethylene feed, at least a portion of which is derived from a biomass ethanol or a bio-syngas ethanol; (b) contacting the bio-ethylene feed with a first oligomerization catalyst system to form a first oligomerization product comprising at least one $C_4$ to $C_{16}$ alpha-olefin; (c) separating a $C_6$ to $C_8$ aliphatic hydrocarbon stream comprising at least one $C_6$ to $C_8$ alpha-olefin and/or $C_6$ to $C_8$ paraffin from the first oligomerization product, providing an alpha-olefin raffinate comprising at least one $C_4$ and/or $C_{10}$-$C_{16}$ alpha-olefin; (d) contacting the $C_6$ to $C_8$ aliphatic hydrocarbon stream with a reforming catalyst to provide a $C_6$ to $C_8$ aromatic hydrocarbon stream; (e) hydrogenating at least a portion of the $C_6$ to $C_8$ aromatic hydrocarbon stream in the presence of a third hydrogenation catalyst to form a $C_6$ to $C_8$ cycloparaffin stream; (f) contacting the alpha-olefin raffinate with a second oligomerization catalyst system to provide a second oligomerization product comprising $C_{16-}$ olefins; (g) hydrogenating the second oligomerization product in the presence of a first hydrogenation catalyst to provide a first $C_{16-}$ paraffin stream. A further aspect provides that the $C_6$ to $C_8$ aromatic hydrocarbon stream, the $C_6$ to $C_8$ cycloparaffin stream, and/or the first $C_{16-}$ paraffin stream can then be used as components to form a sustainable jet fuel.

In any of the processes described herein, the steps of contacting the bio-ethylene feed with the first oligomerization catalyst system and contacting the first oligomerization product with the second oligomerization catalyst system can be carried out in the same reactor, or they can be carried out in separate reactors. The sustainable jet fuels that can be made by the processes include a $C_8$-$C_{16}$ kerosene-type jet fuel and a $C_5$-$C_{15}$ naphtha-type jet fuel, and any of the components of the jet fuel prepared by the disclosed processes can be further purified if desired, or can be used without further purification. Moreover, the sustainable jet fuel or the component thereof can be blended with other non-sustainable fuel components, can be blended with a non-sustainable jet fuel or components thereof, or can be blended with other sustainable jet fuel or components thereof.

In these processes, because the methods are based on the use of bio-ethylene, the sustainable jet fuel can also be certified as compliant with the Carbon Offsetting and Reduction Scheme for International Jet (CORSIA) sustainability criteria, in accordance with the International Sustainability and Carbon Certification (ISCC) CORSIA certification system. These sustainable jet fuels also may be certified as a Lower Carbon Jet Fuel (LCAF) in accordance with the International Sustainability and Carbon Certification (ISCC) LCAF certification system. In one aspect, the certification method can be based upon the weight or fraction of the sustainable jet fuel attributable to the biomass ethanol determined by mass balance and the free attribution method.

Definitions

To define more clearly define the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

Groups of elements of the periodic table are indicated using the numbering scheme from the version of the periodic table of elements published in *Chemical and Engineering News*, 63(5), 27, 1985. In some instances, a group of elements may be indicated using a common name assigned to the group. For example alkali metals for Group 1 elements, alkaline earth metals for Group 2 elements, transition metals for Group 3-12 elements, and halogens or halides for Group 17 elements.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a process, system, or composition as "consisting essentially of" is not to be construed as "comprising," but is intended to describe the recited component that includes materials which do not significantly alter or do not materially affect the basic and novel characteristic(s) of process, system or composition to which the term is applied. For example, a feedstock consisting essentially of a material A can include impurities typically present in a commercially produced or commercially available sample of the recited material A.

When a claim includes different features and/or feature classes (for example, process steps or features, feedstock features, and/or product features, among other possibilities), the transitional terms comprising, consisting essentially of, and consisting of, apply only to feature class to which is utilized and it is possible to have different transitional terms or phrases utilized with different features within a claim. For example, a method can comprise several recited steps (and other non-recited steps) but utilize a catalyst composition preparation consisting of specific steps. In another example, a method can comprise several recited steps (and other non-recited steps) but utilize a catalyst composition consisting essentially of recited components. While compositions and methods are described in terms of "comprising" various components or steps, the compositions and methods can also "consist essentially of" or "consist of" the various components or steps, unless stated otherwise.

The terms "a," "an," and "the" are intended, unless specifically indicated otherwise, to include plural alternatives, e.g., at least one. For instance, the disclosure of "a heating zone" or a "heater" is meant to encompass one heating zone (or heater) or more than one heating zone (or heater) unless otherwise specified.

The terms "configured for use" or "adapted for use" and similar language is used herein to reflect that the particular recited structure or procedure is used in the disclosed and claimed system or process, or in a system or process downstream thereof such as an olefin hydrogenation system or process. For example, a particular structure "configured for use" means it is "configured for use in an oligomerization reactor system" for the processes disclosed herein, unless otherwise specified, and therefore is designed, shaped, arranged, constructed, and/or tailored to effect oligomerization, as would have been understood by the skilled person.

For any particular compound disclosed herein, a general structure or name presented is also intended to encompass all structural isomers, conformational isomers, and stereoisomers that can arise from a particular set of substituents, unless indicated otherwise or unless the context allows or requires otherwise. Thus, a general reference to a compound includes all structural isomers unless explicitly indicated otherwise or unless the context provides or requires otherwise. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges are included in the disclosure of a range, unless excluded by proviso. Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual process steps, reactor elements, chemical substituents, analogs, compounds, ligands, structures, or groups thereof, or any members of a claimed group, if for any reason Applicant chooses to claim less than the full measure of the disclosure.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In embodiments, use of the term "about" can mean±15% of the stated value, ±10% of the stated value, ±5% of the stated value, ±3% of the stated value, ±2% of the stated value, or +1% of the stated value. With any disclosure or claim of "about" a certain value, Applicant intends to include embodiments without the qualifier "about".

The terms "jet fuel" and "aviation fuel" are used interchangeably herein, because the disclosed processes can be used to make fuels that are designed to meet jet engine performance specifications, as well as piston engine performance specifications. Accordingly, the use of one term or the other are non-limiting, including in the claim and aspect preambles which recite a process for making a "sustainable jet fuel," unless otherwise specified or unless otherwise clear to the person of ordinary skill from the usage or context.

The term "hydrocarbon" is used herein to refer to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon).

The term "hydrocarbyl" group is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. Similarly, a "hydrocarbylene" group refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon" group refers to a generalized group formed by removing one or more hydrogen atoms (as necessary for the particular group) from a hydrocarbon. A hydrocarbyl group, hydrocarbylene group, and hydrocarbon group can be aliphatic or aromatic, acyclic or cyclic groups, and/or linear or branched. A hydrocarbyl group, hydrocarbylene group, and hydrocarbon group can include rings, ring systems, aromatic rings, and aromatic ring systems, which contain only carbon and hydrogen. When bonded to a transition metal, a hydrocarbyl group, hydrocarbylene group, and hydrocarbon group can be further described according to the usual $\eta^x$ (eta-x) nomenclature, in which x is an integer corresponding to the number of atoms which are coordinated to the transition metal or are expected to be coordinated to the transition metal, for example, according to the 18-electron rule. "Hydrocarbyl" groups, "hydrocarbylene" groups, and "hydrocarbon" groups include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

The term "aliphatic" is used herein to refer to a class of acyclic or cyclic, saturated or unsaturated, carbon compounds, excluding aromatic compounds, e.g., an aliphatic compound is a non-aromatic organic compound. An "aliphatic" group is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "aromatic" is used herein to describe a compound containing a cyclically conjugated hydrocarbon that follows the Hückel (4n+2) rule and containing (4n+2) pi-electrons, where n is an integer from 1 to about 5. Aromatic compounds may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C═) carbon atoms by trivalent or divalent heteroatoms, in such a way as to maintain the continuous pi-electron system characteristic of aromatic systems and a number of out-of-plane pi-electrons corresponding to the Hückel rule (4n+2)). Thus, an arene is an aromatic hydrocarbon, with or without side chains (e.g., benzene, toluene, or xylene, among others).

The term "olefin" is used herein to refer to acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

The terms "alkane" and "paraffin" are used herein interchangeably to refer to a saturated hydrocarbon compound, and unless otherwise specified, an "alkane" and "paraffin" include linear (n-) and branched (iso-) alkanes (paraffins). Other identifiers can be utilized to indicate the presence of particular groups in the alkane (e.g., halogenated alkane indicates that the presence of one or more halogen atoms replacing an equivalent number of hydrogen atoms in the alkane). Therefore, unless otherwise stated, the term $C_{16-}$ paraffins includes linear $C_{16-}$ n-alkanes and branched $C_{16-}$ iso-alkanes, for example, the $C_{16-}$ paraffins can include $C_{12}$ to $C_{16}$ n-alkanes, $C_{12}$ to $C_{16}$ iso-alkanes, or mixtures thereof.

The carbon count terminology used herein is standard in the industry to reflect a range, an inclusive upper limit, or an inclusive lower limit of a hydrocarbon or mixture of hydrocarbons, and this terminology does not require that each and every carbon count encompassed by the range or limit is present in the composition, as will be understood by the person of ordinary skill. For example, "$C_{16-}$ paraffins" refers to $C_{16}$ and lower carbon number paraffins, but does not necessarily require that all compounds in the disclose range be present. Specifically, the skilled person will appreciate that this terminology is context dependent.

The terms "cycloalkane," "cycloparaffin," and "naphthene" are used herein interchangeably to describe a saturated cyclic hydrocarbon, with or without side chains, for example, cyclobutane. Other identifiers can be utilized to indicate the presence of particular groups in the cycloparaffin (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth.

A chemical "group" or chemical "substituent" may be described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. For example, an "alkyl" group formally can be derived by removing one hydrogen atom from an alkane, while an "alkanediyl" group (also referred to as a "alkylene" group) formally can be derived by removing two hydrogen atoms from an alkane. The disclosure that a substituent, ligand, or other chemical moiety can constitute a particular "group" implies that the known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents as understood by one of ordinary skill in the art.

The term "organyl" group is used herein in accordance with the definition specified by IUPAC: an organic substituent group, regardless of functional type, having one free valence at a carbon atom. Similarly, an "organylene" group refers to an organic group, regardless of functional type, derived by removing two hydrogen atoms from an organic compound, either two hydrogen atoms from one carbon atom or one hydrogen atom from each of two different carbon atoms. An "organic" group refers to a generalized group formed by removing one or more hydrogen atoms from carbon atoms of an organic compound. Thus, an organyl group, an organylene group, and an organic group can contain organic functional group(s) and/or atom(s) other than carbon and hydrogen, that is, an organic group that can comprise functional groups and/or atoms in addition to carbon and hydrogen. For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, and phosphines, and so forth. In one aspect, the hydrogen atom(s) removed to form the "organyl" group, "organylene" group, or "organic" group can be attached to a carbon atom belonging to a functional group, for example, an acyl group (—C(O)R), a formyl group (—C(O)H), a carboxy group (—C(O)OH), a hydrocarboxycarbonyl group (—C(O)OR), a cyano group (—C≡N), a carbamoyl group (—C(O)NH$_2$), a N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the organyl group, organylene group, or organic group can be attached to a carbon atom not belonging to, and remote from, a functional group, for example, —CH$_2$C(O)CH$_3$, —CH$_2$NR$_2$, and the like. An organyl group, organylene group, or organic group can be aliphatic, inclusive of being cyclic or acyclic, or can be aromatic, and/or linear or branched. Organyl groups, organylene groups, and organic groups also encompass heteroatom-containing rings, heteroatom-containing ring systems, heteroaromatic rings, and heteroaromatic ring systems. Organyl groups, organylene groups, and organic groups can be linear or branched unless otherwise specified. Finally, it is noted that the organyl group, organylene group, or organic group definitions include "hydrocarbyl" group, "hydrocarbylene" group, "hydrocarbon" group, respectively, and "alkyl" group, "alkylene" group, and "alkane" group, respectively, (among others known to those having ordinary skill in the art) as members. When bonded to a transition metal, an organyl group, organylene group, or organic group can be further described according to the usual $\eta^x$ (eta-x) nomenclature, in which x is an integer corresponding to the number of atoms which are coordinated to the transition metal or are expected to be coordinated to the transition metal, for example, according to the 18-electron rule.

An "aryl" group is a group derived from the formal removal of a hydrogen atom from an aromatic hydrocarbon ring carbon atom from an arene compound. One example of an "aryl" group is ortho-tolyl (o-tolyl), the structure of which is shown here.

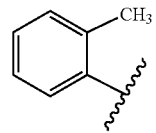 [SMILES: *c1ccccc1C]

Similarly, an "arylene" group refers to a group formed by removing two hydrogen atoms (at least one of which is from an aromatic hydrocarbon ring carbon) from an arene. An "arene" group refers to a generalized group formed by removing one or more hydrogen atoms (as necessary for the particular group and at least one of which is an aromatic hydrocarbon ring carbon) from an arene. However, if a group contains both arene and heteroarene moieties its classification depends upon the particular moiety from which the hydrogen atom was removed, that is, an arene group if the removed hydrogen came from a carbon atom of an aromatic hydrocarbon ring or ring system and a heteroarene group if the removed hydrogen came from a carbon atom of a heteroaromatic ring or ring system. When bonded to a transition metal, an aryl group, arylene group, and arene group can be further described according to the usual $\eta^x$ (eta-x) nomenclature, in which x is an integer corresponding to the number of atoms which are coordinated to the transition metal or are expected to be coordinated to the transition metal, for example, according to the 18-electron rule.

The terms "catalyst", "catalyst composition," "catalyst mixture," "catalyst system," and the like, do not depend upon the actual product or composition resulting from the contact or reaction of the initial components of the claimed catalyst or catalyst composition/mixture/system, the nature of the active catalytic site, or the fate of the co-catalyst, or substrate for the catalyst, or any activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Oligomerization Products

The primary first step in making a sustainable jet fuel from bio-ethylene involves the oligomerization of a bio-ethylene feed, at least a portion of which is derived from a biomass ethanol or a bio-syngas ethanol, to form an olefin oligomerization product comprising $C_4$-$C_{16}$ alpha-olefins. This $C_4$-$C_{16}$ alpha-olefin oligomerization product, which may also contain some $C_4$-$C_{16}$ paraffins, may then be further transformed in one or more subsequent reaction and/or separation pathways to make higher olefin oligomers, aliphatic linear and branched paraffins, cycloparaffins, aromatic compounds, and the like, all of which can constitute components of sustainable jet fuel. Selected amounts of the initial $C_4$-$C_{16}$ alpha-olefin oligomerization product may also be used as jet fuel component if desired.

According to an aspect, the first oligomerization product can comprise $C_4$ to $C_{16}$ alpha-olefins, and the $C_4$ to $C_{16}$ alpha-olefins may comprise for example $C_4$ to $C_{12}$ alpha-olefins such as 1-butene, 1-hexene, 1-octene, 2-butyl-1-hexene, 3-propyl-1-heptene, 4-ethyl-1-octene, 5-methyl-1-nonene, 1-decene, 1-dodecene, and any combinations thereof. In addition the $C_4$ to $C_{16}$ alpha-olefins may comprise olefins outside the $C_4$ to $C_{12}$ alpha-olefin range and even outside the $C_4$ to $C_{16}$ alpha-olefin range, for example, the first oligomerization product may also include a relatively low concentration of higher oligomers such as 1-tetradecene and/or 1-hexadecene, some internal olefins such as 4-decene and 5-decene, some higher olefins outside the $C_4$-$C_{16}$ range, some paraffins including $C_4$-$C_{16}$ paraffins, and/or some higher paraffins outside this range. For example, triethylaluminum-based oligomerization catalysts can produce larger olefins such as $C_{14}$ and $C_{16}$ olefins, and therefore reference to an oligomerization product which can comprise $C_4$ to $C_{16}$ alpha-olefins or $C_4$ to $C_{12}$ alpha-olefins is also intended to reflect that this oligomerization product may also include any or all of these larger olefins.

In this disclosure reference is made to the oligomerization product which can comprise $C_4$ to $C_{16}$ alpha-olefins and $C_4$ to $C_{16}$ paraffins, and these $C_4$ to $C_{16}$ alpha-olefins and paraffins may comprise for example 1-butene, 1-hexene, 1-octene, 2-butyl-1-hexene, 3-propyl-1-heptene, 4-ethyl-1-octene, 5-methyl-1-nonene, 1-decene, 1-dodecene, n-butane, n-hexane, n-octane, 5-methyl-nonane, 4-ethyl-octane, n-decane, n-dodecane, or any combinations thereof. Accordingly, in addition to these $C_4$ to $C_{16}$ alpha-olefins and paraffins, the oligomerization product may also include, for example, some higher oligomers outside the $C_4$ to $C_{16}$ range such as 1-tetradecene, 1-hexadecene, some internal olefins such as 4-decene and 5-decene, and outside this $C_4$-$C_{16}$ range such as n-tetradecane and n-hexadecene.

In a further aspect, the oligomerization product can include $C_4$ to $C_{16}$ alpha-olefins or the $C_4$ to $C_{16}$ alpha-olefins and paraffins which comprise at least about 50 wt. % 1-butene, at least about 50 wt. % 1-hexene, or at least about 50 wt. % 1-octene.

After contacting the bio-ethylene feed with the first oligomerization catalyst system to form the oligomerization product, this oligomerization product subsequently can be contacted with a second oligomerization catalyst system to provide a $C_{16-}$ olefin stream. This $C_{16-}$ olefin stream can comprise 1-butene, 1-hexene, 1-octene, 2-butyl-1-hexene, 3-propyl-1-heptene, 4-ethyl-1-octene, 5-methyl-1-nonene, 4-decene, 5-decene, 1-dodecene, 1-tetradecene, 1-hexadecene, or any combinations thereof.

In an aspect, this $C_{16-}$ olefin stream can be hydrogenated and used as a component of the sustainable jet fuel. Therefore, this $C_{16-}$ paraffin stream comprises $C_{16-}$ n-alkanes and $C_{16-}$ iso-alkanes. For example, the $C_{16-}$ paraffin stream can comprise $C_8$ to $C_{16}$ n-alkanes and $C_8$ to $C_{16}$ iso-alkanes or $C_{12}$ to $C_{16}$ n-alkanes and $C_{12}$ to $C_{16}$ iso-alkanes. Jet fuels contain primarily saturated hydrocarbon compounds, including linear and branched alkanes and cycloalkanes. Therefore, the $C_{16-}$ paraffin stream can be used as a component of sustainable jet fuel, or a portion of the $C_{16-}$ paraffin stream can be separated out for reforming to make aromatic hydrocarbons, or both. For example, when the bio-ethylene feed is contacted with a first oligomerization catalyst system to form an oligomerization product comprising $C_4$ to $C_{16}$ alpha-olefins and paraffins, a $C_6$ to $C_8$ aliphatic hydrocarbon stream can be separated from the $C_4$ to $C_{16}$ alpha-olefins and paraffins, and subsequently contacted with a reforming catalyst to provide a $C_6$ to $C_8$ aromatic hydrocarbon stream. In a further aspect, the $C_6$ to $C_8$ aromatic hydrocarbon stream may then be hydrogenated in the presence of a hydrogenation catalyst to form a $C_6$ to $C_8$ cycloparaffin (naphthene) stream, which can be used as a component of a sustainable jet fuel.

According to an aspect, when a $C_6$ to $C_8$ aliphatic hydrocarbon stream is separated from the $C_4$ to $C_{16}$ alpha-olefins and paraffins, the $C_6$ to $C_8$ aliphatic hydrocarbon stream can include $C_6$ to $C_8$ alpha-olefins and paraffins, comprising for example 1-hexene, 1-heptene, 1-octene, 2-ethyl-1-butene, 2-methyl-1-pentene, 3-methyl-1-pentene, 4-methyl-1-pentene, 2-methyl-1-hexene, 3-methyl-1-hexene, 4-methyl-1-hexene, 5-methyl-1-hexene, 2-ethyl-1-pentene, 3-ethyl-1-pentene, 2-ethyl-1-hexene, 3-ethyl-1-hexene, 4-ethyl-1-hexene, or any combinations thereof. When this $C_6$ to $C_8$ aliphatic hydrocarbon stream is reformed in the presence of a reforming catalyst of an AROMAX® catalyst, the resulting $C_6$ to $C_8$ aromatic hydrocarbon stream can comprise benzene, toluene, ethylbenzene, o-xylene, m-xylene, p-xylene, or any combinations thereof.

Separating the $C_6$ to $C_8$ aliphatic hydrocarbon stream from the oligomerization $C_4$ to $C_{16}$ alpha-olefins and paraffins provides a $C_4$ and $C_{10}$-$C_{12}$ alpha-olefin raffinate. This $C_4$ and $C_{10}$-$C_{12}$ alpha-olefin raffinate can include a mixture of decenes, and the $C_4$ and $C_{10}$-$C_{12}$ alpha-olefin raffinate can comprise from 1 wt. % to 15 wt. % decenes. In an aspect, the $C_4$ and $C_{10}$-$C_{12}$ alpha-olefin raffinate can comprise 2-butyl-1-hexene, 3-propyl-1-heptene, 4-ethyl-1-octene, 5-methyl-1-nonene, 4-decene, 5-decene, or any combination thereof. The $C_4$ and $C_{10}$-$C_{12}$ alpha-olefin raffinate can be used by contacting it with a second oligomerization catalyst system, which can form a $C_{16-}$ olefin stream which can be further hydrogenated and used in other ways as described herein.

Further features, aspects, embodiments, and statements of the disclosure are provided in the numbered Aspects which follow the Examples.

Oligomerization Catalyst Systems

This disclosure describes the use of two oligomerization catalysts, also termed catalyst systems, which are used to provide the sustainable jet fuel or jet fuel components. Generally, the first catalyst system is used to contact with the bio-ethylene feed to provide a first oligomerization product. The second catalyst system is used to contact with this first oligomerization product or in some embodiments with a $C_4$ and $C_{10}$-$C_{12}$ alpha-olefin raffinate to form the $C_{16-}$ olefin stream, which is used in further processes to form the sustainable jet fuel or jet fuel components. However, the first oligomerization catalyst system and the second oligomerization catalyst system can comprise or can be selected from, independently, any oligomerization catalyst. For example, the first oligomerization catalyst system, the second oligomerization catalyst system, or both independently can comprise chromium-based catalyst, a metallocene-based catalyst, a Ziegler-Natta based catalyst, a metal-oxide supported Group 6-10 transition metal-based catalyst, or any combination thereof.

Aspects of this disclosure are provided in the following references, each of which is incorporated herein by reference in its entirety: U.S. Pat. Nos. 6,291,733; 8,334,420; 8,680,003; 8,791,217; 9,115,225; 9,175,109; 9,352,309; 9,708,549; 9,745,230; 9,968,921; 10,183,899; 10,240,102; 10,329,212; 10,414,698; 10,435,334; 10,435,336; 10,544,070; 10,927052; 11,072,569; and 11,358,914. These references describe chromium-based catalysts and other catalysts which are useful for the ethylene oligomerization process describe herein, and can be employed as the first oligomerization catalyst system or the second oligomerization catalyst system.

In another aspect, the first oligomerization catalyst system, the second oligomerization catalyst system, or both independently can comprise or can be selected from tungstated zirconium, molybdenum zirconium, nickel and/or cobalt doped tungstated zirconium, nickel and/or cobalt doped molybdenum zirconium catalysts, a Group 3 to Group 12 metal-treated zeolite, or combinations thereof.

In a further aspect, the first oligomerization catalyst system, the second oligomerization catalyst system, or both independently can comprise, consist essentially of, or be selected from molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof.

In one aspect, the first oligomerization catalyst system, the second oligomerization catalyst system, or both independently can comprise, consist essentially of, or can be selected from a chromium-based catalyst, as described in detail herein. In an aspect, the second oligomerization catalyst system, can comprise a metallocene-based catalyst, a Ziegler-Natta based catalyst, a metal-oxide supported Group 6-10 transition metal-based catalyst, or a combination thereof. For example, the chromium-based catalyst system can form the oligomerization product comprising $C_4$-$C_{16}$ alpha-olefins, and either the same chromium-based catalyst system, a different chromium-based catalyst system, or one of the metallocene-based catalyst, a Ziegler-Natta based catalyst, or a metal-oxide supported Group 6-10 transition metal-based catalyst, or classic metathesis catalysts such as molybdenum oxide on alumina ($MoO_3/Al_2O_3$), tungsten oxide on silica ($WO_3/SiO_2$), and the like can be used to oligomerize $C_4$-$C_{16}$ alpha-olefins or the $C_4$ and $C_{10}$-$C_{12}$ alpha-olefin raffinate to provide a $C_{16-}$ olefin stream.

In the process for making a sustainable jet fuel, the first oligomerization catalyst system, the second oligomerization catalyst system, or both independently can further comprise a metal alkyl compound which comprises, consists essentially of, or is an organoaluminum compound, an organoaluminoxane, an organoboron compound, an organozinc compound, an organomagnesium compound, an organolithium compound, or any combination thereof. For example, the metal alkyl compound comprises, consists essentially of, or can be a compound having the general formula: a) $M^3(X^{10})_n(X^{11})_{3-n}$, wherein $M^3$ is boron or aluminum and n is from 1 to 3 inclusive; b) $M^4(X^{10})_n(X^{11})_{2-n}$, wherein $M^4$ is magnesium or zinc and n is from 1 to 2 inclusive; or c) $M^5X^{10}$, wherein $M^5$ is Li; wherein $X^{10}$ is independently hydride or a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide.

In this aspect, when the first oligomerization catalyst system, the second oligomerization catalyst system, or both independently include an organoaluminum compound, the organoaluminum compound can comprise, consist essentially or, or can be a triorganoaluminum compound, a diorganoaluminum halide, an organoaluminum dihalide, a diorganoaluminum alkoxide, an organoaluminum dialkoxide, an aluminoxane, or combinations thereof. For example, the organoaluminum compound can comprise, consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and similar compounds, or any combination thereof.

In the process for making a sustainable aviation fuel, in an aspect, the first oligomerization catalyst system, the second oligomerization catalyst system, or both independently can further comprise hydrogen. Alternatively, the first oligomerization catalyst system, the second oligomerization catalyst system, or both independently can further comprise hydrogen, for example, at a partial pressure of from 2 psi to 100 psi; 5 psi to 75 psi; or 10 psi to 50 psi.

Chromium-Based Catalyst System

In an aspect, the first oligomerization catalyst system, the second oligomerization catalyst system, or both independently can comprises or consist essentially of a chromium-based catalyst. The chromium-based catalyst system uses a combination of catalyst components that include a chromium compound and certain heteroatomic compounds referred to as "heteroatomic ligands" which can constitute a ligand on the chromium compound itself or can be used as a separate component of the chromium-based catalyst in combination with a chromium compound that does not include the heteroatomic ligand.

The chromium-based catalyst can comprise or can consist essentially of (a) a chromium-containing compound, (b) a heteroatomic ligand, (c) a metal alkyl compound, and (d) optionally, a diluent. Again, the heteroatomic ligand can be a separate component of the first oligomerization catalyst system, the second oligomerization catalyst system, or both, or it can be a ligand complexed to the chromium-containing compound of the first oligomerization catalyst system, the second oligomerization catalyst system, or both. As an example, the heteroatomic ligands can comprise, consist essentially of, or be selected from a pyrrole compound, a diphosphino aminyl compound, an $N^2$-phosphinyl amidine compound, or an $N^2$-phosphinyl formamidine compound.

In an aspect of this disclosure the first oligomerization catalyst system, the second oligomerization catalyst system, or both independently can comprise, consist essentially of, or are selected from: (a) a chromium-containing compound, a pyrrole compound, an organoaluminum compound, and optionally a halide containing compound; (b) a chromium-containing compound, a diphosphino aminyl compound, an organoaluminum compound; (c) a chromium-containing compound complexed to a diphosphino aminyl compound, and an organoaluminum compound; (d) a chromium-containing compound, an $N^2$-phosphinyl amidine compound, and an organoaluminum compound; (e) a chromium-containing compound complexed to an $N^2$-phosphinyl amidine compound, and an organoaluminum compound; (f) a chromium-containing compound, an $N^2$-phosphinyl formamidine compound, an organoaluminum compound; (g) a chromium-containing compound complexed to an $N^2$-phosphinyl formamidine compound, and an organoaluminum compound; or (h) any combinations thereof.

According to an aspect, the chromium-containing compound can comprise, consist essentially of, or be selected from chromium(II) nitrate, chromium(II) sulfate, chromium (II) fluoride, chromium(II) chloride, chromium(II) bromide, or chromium(II) iodide, chromium(III) nitrate, chromium (III) sulfate, chromium(III) fluoride, chromium(III) chloride, chromium(III) bromide, or chromium(III) iodide.

In another aspect, the chromium-containing compound can be selected from a chromium(II) carboxylate, a chromium(II) alkoxide, chromium(II) aryloxide, a chromium(II) beta-dionate (i.e. beta-diketonate), a chromium(III) carboxylate, a chromium(III) alkoxide, chromium(III) aryloxide, or a chromium(III) beta-dionate (i.e. beta-diketonate). In one example, each carboxylate group of the chromium-containing compound independently can be a $C_2$ to $C_{24}$ carboxylate group, or alternatively a $C_4$ to $C_{19}$ carboxylate group, or alternatively, a $C_5$ to $C_{12}$ carboxylate group. In another example, each alkoxide group of the chromium-containing compound independently can be a $C_1$ to $C_{24}$ alkoxy group, alternatively, a $C_4$ to $C_{19}$ alkoxy group, or alternatively, a $C_5$ to $C_{12}$ alkoxy group. In other examples, each aryloxide group of the chromium-containing compound independently can be a $C_6$ to $C_{24}$ aryloxy group, alternatively, a $C_6$ to $C_{19}$ aryloxy group, or alternatively, a $C_6$ to $C_{12}$ aryloxy group. Each beta-dionate group of the chromium-containing compound independently can be a $C_5$ to $C_{24}$ beta-dionate group, alternatively, a $C_5$ to $C_{19}$ beta-dionate group, or alternatively, a $C_5$ to $C_{12}$ beta-dionate group.

According to an aspect, the first oligomerization catalyst system, the second oligomerization catalyst system, or both independently can comprise a chromium carboxylate comprising or consisting essentially of an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate. The first oligomerization catalyst system, the second oligomerization catalyst system, or both independently also may comprise a chromium carboxylate wherein each carboxylate group of the chromium carboxylate is independently selected from acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate).

Chromium carboxylates are useful chromium compounds, for example, the first oligomerization catalyst system, the second oligomerization catalyst system, or both independently can comprise a chromium carboxylate comprising, consisting essentially of, or selected from chromium (II) acetate, chromium(II) propionate, chromium(II) butyrate, chromium(II) isobutyrate, chromium(II) neopentanoate, chromium(II) oxalate, chromium(II) octanoate, chromium(II) 2-ethylhexanoate, chromium(II) laurate, or chromium(II) stearate, chromium(III) acetate, chromium (III) propionate, chromium(III) butyrate, chromium(III) isobutyrate, chromium(III) neopentanoate, chromium(III) oxalate, chromium(III) octanoate, chromium(III) 2-ethylhexanoate, chromium(III) 2,2,6,6-tetramethylheptanedionate, chromium(III) naphthenate, chromium(III) laurate, or chromium(III) stearate.

Heteroatomic Ligands

The heteroatomic ligands for the chromium-based catalyst system described herein can be used as a separate component of the chromium-based catalyst in combination with a chromium compound, or the heteroatomic ligands can constitute a ligand on the chromium compound itself. In an aspect, the heteroatomic ligand can comprise, can consist essentially of, or can be, an amine compound, an amide compound, an imide compound, or combinations thereof. For example, the heteroatomic ligand can comprise, can consist essentially of, or can be: (a) a $C_2$ to $C_{30}$ amine; alternatively, a $C_2$ to $C_{20}$ amine; alternatively, $C_2$ to $C_{15}$ amine; or alternatively, a $C_2$ to $C_{10}$ amine; (b) a $C_3$ to $C_{30}$ amide; alternatively, a $C_3$ to $C_{20}$ amide; alternatively, $C_3$ to $C_{15}$ amide; or alternatively, a $C_3$ to $C_{10}$ amide; or (c) a $C_4$ to $C_{30}$ imide; alternatively, a $C_4$ to $C_{20}$ imide; alternatively, $C_4$ to $C_{15}$ imide; or alternatively, a $C_4$ to $C_{10}$ imide.

In a further aspect, the heteroatomic ligand can comprise, can consist essentially of, or can be, a pyrrole compound, a diphosphino aminyl compound, an $N^2$-phosphinyl amidine compound, an $N^2$-phosphinyl formamidine compound, or combinations thereof. For example, the heteroatomic ligand can comprise, can consist essentially of, or can be: (a) any pyrrole compound that can form a chromium pyrrolide complex; (b) is pyrrole ($C_5H_5N$), a derivative of pyrrole (e.g., indole), a substituted pyrroles, or a metal pyrrolide compound; or (c) pyrrole or any heteroleptic or homoleptic metal complex or salt containing a pyrrolide radical or ligand; or (b) a $C_4$ to $C_{30}$ pyrrole; alternatively, a $C_4$ to $C_{20}$ pyrrole; alternatively, $C_4$ to $C_{15}$ pyrrole; or alternatively, a $C_4$ to $C_{10}$ pyrrole.

In another aspect, the heteroatomic ligand can comprise, can consist essentially of, or can be a pyrrole compound having the Formula P1 or Formula II:

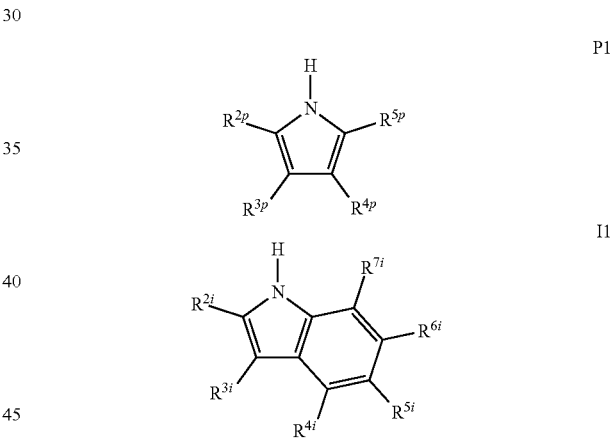

wherein: $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be:

hydrogen, a $C_1$ to $C_{18}$ organyl group, a $C_1$ to $C_{18}$ hydrocarbyl group, or a $C_3$ to $C_{60}$ silyl group;

alternatively, hydrogen, a $C_1$ to $C_{15}$ organyl group, a $C_1$ to $C_{15}$ hydrocarbyl group, or a $C_3$ to $C_{45}$ silyl group;

alternatively, hydrogen, a $C_1$ to $C_{10}$ organyl group, a $C_1$ to $C_{10}$ hydrocarbyl group, or a $C_3$ to $C_{30}$ silyl group;

alternatively, hydrogen, a $C_1$ to $C_5$ organyl group, a $C_1$ to $C_5$ hydrocarbyl group, or a $C_3$ to $C_{15}$ silyl group.

For example, $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be: hydrogen, or a $C_1$ to $C_{18}$ hydrocarbyl group; alternatively, hydrogen, or a $C_1$ to $C_{15}$ hydrocarbyl group; alternatively, hydrogen, or a $C_1$ to $C_{10}$ hydrocarbyl group; or alternatively, hydrogen, or a $C_1$ to $C_5$ hydrocarbyl group.

In another aspect, the pyrrole compound can comprise, can consist essentially of, or can be, pyrrole, 2,5-dimethylpyrrole, 2-methyl-5-ethylpyrrole, 2-methyl-5-propylpyrrole, 2,5-diethylpyrrole, 3,4-dimethylpyrrole, 2,5-di-n-propylpyrrole, 2,5-di-n-butylpyrrole, 2,5-di-n-pentylpyrrole, 2,5-di-n-hexylpyrrole, 2,5-di-n-heptylpyrrole, 2,5-di-n-octylpyrrole, 2,5-dibenzylpyrrole, 2,4-dimethyl-3-ethylpyrrole, 2,3,5-triethylpyrrrole, 2,3,5-tri-n-butylpyrrrole, 2,3,5-tri-n-pentylpyrrrole, 2,3,5-tri-n-hexylpyrrrole, 2,3,5-tri-n-heptylpyrrrole, 2,3,5-tri-n-octylpyrrrole, 2,3,4,5-tetraethylpyrrole, 2,3,4,5-tetra-n-butylpyrrole, 2,3,4,5-tetra-n-hexylpyrrole, 2,5-bis(2',2',2'-trifluoroethyl)pyrrole, 2,5-bis(2'-methoxymethyl)pyrrole, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neopentylpyrrole, 2-ethyl-4-neopentylpyrrole, 3,4-diisopropylpyrrole, 3,4-di-sec-butylpyrrole, 3,4-diisobutylpyrrole, 3,4-di-t-butylpyrrole, 3,4-di-neopentylpropylpyrrole, tetrahydroindole, dipyrrolylmethane, indole, 3,4-dichloropyrrole, 2,3,4,5-tetrachloropyrrole, pyrrole-2-carboxylic acid, 2-acetylpyrrole, pyrrole-2-carboxaldehyde, 3-acetyl-2,4-dimethylpyrrole, ethyl-2,4-dimethyl-5-(ethoxycarbonyl)-3-pyrrole-propionate, or ethyl-3,5-dimethyl-2-pyrrolecarboxylate.

According to another aspect of the heteroatomic ligand, the pyrrole compound can comprise, can consist essentially of, or can be: (a) a metal pyrrolide, such as an alkyl metal pyrrolide; (b) a diorganoaluminum pyrrolide of any pyrrole provided herein; (c) diethylaluminum 2,5-dimethylpyrrolide, ethylaluminum di(2,5-dimethylpyrrolide), aluminum tri(2,5-dimethylpyrrolide), or combinations thereof.

The heteroatomic ligand also may comprise, can consist essentially of, or can be, a diphosphino aminyl compound (i.e. a compound comprising a P—N—P (phosphorus-nitrogen-phosphorus) linkage). For example, the heteroatomic ligand can comprise, can consist essentially of, or can be a diphosphino aminyl moiety having Structure PNP2:

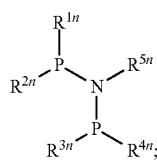

PNP2 wherein the $R^{1n}$, $R^{2n}$, $R^{3n}$, $R^{4n}$, and/or $R^{5n}$, independently can be:
(a) a $C_1$ to $C_{30}$ organyl group; alternatively, a $C_1$ to $C_{20}$ organyl group; alternatively, a $C_1$ to $C_{15}$ organyl group; alternatively, a $C_1$ to $C_{10}$ organyl group; or alternatively, a $C_1$ to $C_5$ organyl group;
(b) a $C_1$ to $C_{30}$ organyl group comprising inert functional groups; alternatively, a $C_1$ to $C_{20}$ organyl group comprising inert functional groups; alternatively, a $C_1$ to $C_{15}$ organyl group comprising inert functional groups; alternatively, a $C_1$ to $C_{10}$ organyl group comprising inert functional groups; or alternatively, a $C_1$ to $C_5$ organyl group comprising inert functional groups;
(c) a $C_1$ to $C_{30}$ hydrocarbyl group; alternatively, a $C_1$ to $C_{20}$ hydrocarbyl group; alternatively, a $C_1$ to $C_{15}$ hydrocarbyl group; alternatively, a $C_1$ to $C_{10}$ hydrocarbyl group; or alternatively, a $C_1$ to $C_5$ hydrocarbyl group;
(d) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group;
(e) a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(f) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; alternatively, a phenyl group or a $C_6$ to $C_{10}$ substituted phenyl group; or alternatively, a phenyl group; or
(g) a substituted or an unsubstituted $C_1$ to $C_{20}$ alkyl group, $C_5$ to $C_{20}$ cycloalkyl group, or $C_6$-$C_{20}$ aromatic group; wherein any substituents are selected independently from a $C_1$ to $C_{10}$ hydrocarbyl group.

In this Structure PNP2, $R^{1n}$ and $R^{2n}$, and/or $R^{3n}$ and $R^{4n}$ of the diphosphino aminyl moiety can be joined to form a ring containing a phosphorus atom of the diphosphino aminyl moiety. For example, $R^{1n}$ and $R^{5n}$, or $R^{4n}$ and $R^{5n}$ of the diphosphino aminyl moiety can be joined to form a ring containing a phosphorus atom and the nitrogen atom of the diphosphino aminyl moiety.

The heteroatomic ligand also may comprise, can consist essentially of, or can be an $N^2$-phosphinyl formamidine compound having Structure NPF1, or an $N^2$-phosphinyl formamidine compound having Structure NPA1:

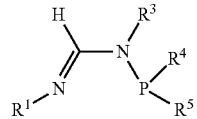

Structure NPF1

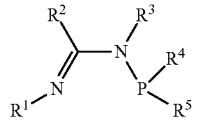

Structure NPA1 wherein $R^1$, $R^2$, $R^3$, $R^4$, and $R^5$ within Structure NPF1 and Structure NPFCr1 are independently:
(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;
(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or
(c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group; (d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or (e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

In view of the heteroatomic ligand disclosed herein and in another aspect, the chromium-containing compound complexed to an $N^2$-phosphinyl formamidine compound or the chromium-containing compound complexed to an $N^2$-phosphinyl amidine compound have the following structures:

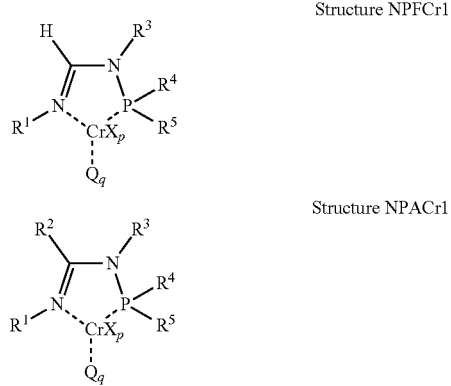

Structure NPFCr1

Structure NPACr1 wherein X is an anionic ligand, and p is from 2 to 6, Q is a neutral ligand such as a nitrile ligand or an ether ligand, and q is from 0 to 6; and wherein $R^1$, $R^2$, $R^3$, $R^4$, and $R^5$ within Structure NPF1 and Structure NPFCr1 are independently:

(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;

(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or (c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;

(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or (e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

In another aspect, $R^1$ is a $C_1$ to $C_{15}$ alkyl group, a $C_4$ to $C_{20}$ cycloalkyl group, a $C_4$ to $C_{20}$ substituted cycloalkyl group, a $C_6$ to $C_{20}$ aryl group, or a $C_6$ to $C_{20}$ substituted aryl group; $R^2$ is a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof; $R^3$ is hydrogen, $R^4$ and $R^5$ are each independently a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof.

In any of the heteroatomic ligands disclosed herein, any substituent of a substituted group can be selected from: (a) a halide, a hydrocarbyl group, or a hydrocarboxy group; alternatively, a halide or a hydrocarbyl group; (b) a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group.

Organoaluminum Compounds

In the process for making a sustainable jet fuel, the first oligomerization catalyst system, the second oligomerization catalyst system, or both independently can further comprise a metal alkyl compound, which can include an organoaluminum compound such as a trialkylaluminum compound or an organoaluminoxane. For example, the chromium-based catalyst systems can comprise or can consist essentially of (a) a chromium-containing compound, (b) a heteroatomic ligand, (c) a metal alkyl compound, particularly an organoaluminum compound, and (d) optionally, a diluent.

In an aspect, the organoaluminum compound can comprise, consist essentially of, or be selected from a triorganoaluminum compound, a diorganoaluminum halide, an organoaluminum dihalide, a diorganoaluminum alkoxide, an organoaluminum dialkoxide, an aluminoxane, or combinations thereof. In an aspect, the organoaluminum compound can have a general formula $Al(R^{10})_n(X^{11})_{3-n}$, wherein: n is from 1 to 3 inclusive; each $R^{10}$ is independently a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide. For example, the organoaluminum compound organoaluminum compound can comprise, consist of, consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

In a further aspect, the organoaluminum compound can comprise, consist essentially of, or can be selected from an aluminoxane compound. For example, the organoaluminum compound can comprise, consist essentially of, or be selected from at least one aluminoxane compound, and wherein the aluminoxane comprises a cyclic aluminoxane having the formula

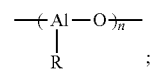

wherein R is a linear or branched alkyl having from 1 to 10 carbon atoms, and n is an integer from 3 to about 10; a linear aluminoxane having the formula

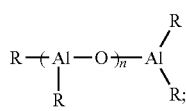

wherein R is a linear or branched alkyl having from 1 to 10 carbon atoms, and n is an integer from 1 to about 50; a cage aluminoxane having the formula $R^t_{5m+\alpha}R^b_{m-\alpha}Al_{4m}O_{3m}$, wherein m is 3 or 4 and $\alpha=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms; or any combination thereof. In another aspect, the organoaluminum compound can comprise, consist essentially of, or be selected from an aluminoxane having the formula $(R^C-Al-O)_t$ or $R^C(R^C-Al-O)_tAl(R^C)_2$, wherein $R^C$ is a linear or branched $C_1$-$C_6$ alkyl such as methyl, ethyl, propyl, butyl, pentyl, or hexyl wherein t is an integer from 1 to 50, inclusive, or t is an integer from 2 to 20.

Examples of organoaluminoxane compounds can include, but are not limited to, the following. In an aspect, the organoaluminum compound can comprise, consist essentially of, or can be selected from methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butylaluminoxane, sec-butylaluminoxane, isobutylaluminoxane, t-butyl aluminoxane, 1-pentylaluminoxane, 2-pentylaluminoxane, 3-pentylaluminoxane, iso-pentylaluminoxane, neopentylaluminoxane, or any combinations thereof.

Diluents

As described herein, the chromium-based catalyst can comprise or can consist essentially of (a) a chromium-containing compound, (b) a heteroatomic ligand, (c) a metal alkyl compound, and (d) optionally, a diluent. Other catalyst systems described herein can optionally include a diluent if at least a portion of the reaction process is conducted in solution or a slurry. Therefore in an aspect, the first oligomerization catalyst system, the second oligomerization catalyst system, or both independently can comprise a diluent. For example, the diluent can comprise, consist essentially of, or be selected from a hydrocarbon, a halogenated hydrocarbon, or combinations thereof. In another aspect, the diluent can comprise, consist essentially of, or be selected from a cyclic diluent, an acyclic diluent, or combinations thereof. In another aspect, the diluent can comprise, consist essentially of, or be selected from a linear diluent, a branched diluent, or combinations thereof.

The diluent used according to this disclosure can also comprise, consist essentially of, or be selected from a aliphatic hydrocarbons, aromatic hydrocarbons, petroleum distillates, halogenated aliphatic hydrocarbons, halogenated aromatic hydrocarbons, or combinations thereof. For example, the diluent can comprise, consist essentially of, or be selected from a $C_3$ to $C_8$ linear or branched acyclic aliphatic hydrocarbon, $C_6$ to $C_{10}$ aromatic hydrocarbons, $C_1$ to $C_{15}$ halogenated aliphatic hydrocarbons, $C_1$ to $C_{10}$ halogenated aliphatic hydrocarbons, $C_1$ to $C_5$ halogenated aliphatic hydrocarbons, $C_6$ to $C_{20}$ halogenated aromatic hydrocarbons, $C_6$ to $C_{10}$ halogenated aromatic hydrocarbons, or combinations thereof.

In a further aspect, the diluent can comprise, consist essentially of, or be selected from a propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), cyclohexane, methyl cyclohexane, benzene, toluene, xylene (including ortho-xylene, meta-xylene, para-xylene, or mixtures thereof), ethylbenzene, methylene chloride, chloroform, carbon tetrachloride, dichloroethane, trichloroethane, chlorobenzene, dichlorobenzene, or combinations thereof, which represent examples of suitable diluents.

Oligomerization Conditions

In the process for making a sustainable aviation fuel according to this disclosure, the oligomerization conditions can vary according to the olefin stream, the catalyst, and the like. In an aspect, contacting the bio-ethylene feed with the first oligomerization catalyst system can be carried out at a total pressure of from 0 psig (0 KPa) to 2,500 psig (17.3 MPa); alternatively, from 0 psig (KPa) to 1,600 psig (11.0 MPa); alternatively, from 0 psig (KPa) to 1,500 psig (10.4 MPa); alternatively, from 50 psig (344 KPa) to 2,500 psig (17.3 MPa); alternatively, from 100 psig (689 KPa) to 2,500 psig (17.3 MPa); alternatively, from 150 psig (1.0 MPa) to 2,000 psig (13.8 MPa); or alternatively, from 300 psig (2.0 MPa) to 900 psig (6.2 MPa). In another aspect, contacting the bio-ethylene feed with the first oligomerization catalyst system can occur at a bio-ethylene feed pressure of from 0 psig (0 KPa) to 2,500 psig (17.3 MPa); alternatively, from 50 psig (344 KPa) to 2,500 psig (17.3 MPa); alternatively, from 100 psig (689 KPa) to 2,500 psig (17.3 MPa); or alternatively, from 150 psig (1.0 MPa) to 2,000 psig (13.8).

Contacting the bio-ethylene feed with the first oligomerization catalyst system can occur at any temperature which effects the desired oligomerization reactions. For example, contacting the bio-ethylene feed with the first oligomerization catalyst system can occur at a temperature of at least 0° C.; alternatively, at least 10° C.; alternatively, at least 20° C.; alternatively, at least 30° C.; alternatively, at least 40° C.; alternatively, at least 50° C.; alternatively, at least 60° C.; alternatively, at least 70° C.; alternatively, at least 80° C.; alternatively, at least 90° C.; alternatively, at least 100° C.; alternatively, at least 110° C.; alternatively, at least 120° C.; alternatively, at least 130° C.; alternatively, at least 140° C.; alternatively, at least 150° C.; alternatively, at least 160° C.; alternatively, at least 170° C.; or alternatively, at least 180° C. The step of contacting the bio-ethylene feed with the first oligomerization catalyst system can occur at a temperature of less than 180° C.; alternatively, less than 160° C.; alternatively, less than 140° C.; alternatively, less than 120° C.; alternatively, less than 100° C.; alternatively, less than 90° C.; or alternatively, less than 80° C.

In other aspects, contacting the bio-ethylene feed with the first oligomerization catalyst system can occur at a temperature within a range of from 0° C. to 180° C.; alternatively, from 10° C. to 160° C.; alternatively, from 20° C. to 140° C.; alternatively, from 30° C. to 120° C.; alternatively, from 40° C. to 100° C.; alternatively, from 50° C. to 100° C.; or alternatively, from 60° C. to 140° C.

Reforming or Aromatization Catalyst Systems

An aspect of this disclosure provides that a $C_6$ to $C_8$ aliphatic hydrocarbon stream containing, for example, $C_6$ to $C_8$ alpha-olefins and paraffins, can be separated from the first oligomerization product or can be separated from the C$_{16-}$ olefin stream or the C$_{16-}$ paraffin stream, and contacted with a reforming catalyst to provide a C$_6$ to C$_8$ aromatic hydrocarbon stream. The C$_6$ to C$_8$ aromatic hydrocarbon stream itself can be used as a component in the sustainable jet fuel or can be subjected to catalytic hydrogenation to form the C$_6$ to C$_8$ cycloparaffin stream as a component to form a sustainable jet fuel.

Any reforming or "aromatization" catalyst may be used according to this disclosure. Generally, the reforming or aromatization catalyst systems may comprise an inorganic support, a Group 8-10 metal such as platinum, and one or more halides such as fluorine, chlorine, iodine, bromine, or combinations thereof. In some embodiments, the catalyst may comprise Group 8-10 metals on an inorganic support such as platinum on alumina, Pt/Sn on alumina and Pt/Re on alumina. In other embodiments, the catalyst may comprise a platinum metal on a zeolitic support such as Pt, Pt/Sn and Pt/Re on zeolitic supports which may comprise a binder and zeolites such as L-zeolites, X-zeolite, mordenite, mazzite, and ZSM-5. Other reforming or aromatization catalysts can include the platinum metals, fluorine, and chlorine, typically on alkali- and alkaline-earth exchanged L-zeolites. The catalyst may comprise a large-pore zeolite as the inorganic support, charged with at least one Group 8-10 metal. For example, the catalysts may comprise a low-acidity silica-bound potassium L-type zeolite support, platinum, chloride, and fluoride. In embodiments, the Group 8-10 metal may comprise platinum, which may be more selective for dehydrocyclization and which may be more stable under reforming reaction conditions than other Group 8-10 metals. In other embodiments, the catalyst may comprise a Group 7 metal such as rhenium, or a Group 14 metal or metalloid such as tin.

Examples of reforming/aromatization catalysts that can be used in the methods and systems of this disclosure include, but are not limited to: the AROMAX® brand of catalysts available from the Chevron Phillips Chemical Company LP of The Woodlands, Texas; the catalysts discussed in U.S. Pat. No. 6,812,180 to Fukunaga entitled "Method for Preparing Catalyst"; the catalysts disclosed in U.S. Pat. No. 7,153,801 to Wu entitled "Aromatization Catalyst and Methods of Making and Using Same"; and catalysts such as the halided zeolite catalysts (hiz-cat) described in U.S. Pat. No. 6,190,539 to Holtermann et al. entitled "Reforming Using a Bound Halided Zeolite Catalyst"; the catalysts disclosed in U.S. Pat. No. 7,902,105 to Khare entitled "Aromatization catalyst comprising prolongated silica and methods of making and using same"; or the catalysts disclosed in U.S. Patent Publication No. 2018/0065115 to Alvez-Manoli entitled "Acidic Aromatization Catalyst with Improved Activity and Stability"; each of which is incorporated herein by reference in its entirety. In a further aspect, the disclosed process for making a sustainable jet fuel can employ a reforming catalyst whch comprises, consists essentially of, or is selected from a Honeywell UOP (Charlotte, North Carolina) R-234™ catalyst, R-254™ catalyst, R-264™ catalyst, R-334™ catalyst, R-364™ catalyst, R-464™ catalyst, or RMY-7™ catalyst.

In an aspect, the catalyst may comprise a non-acidic zeolite support as the inorganic support, a Group 8-10 metal or other suitable metals, and one or more halides. Suitable halides include chloride, fluoride, bromide, iodide, or combinations thereof. Suitable Group 8-10 metals include iron, cobalt, nickel, ruthenium, rhodium, palladium, osmium, iridium, platinum, or combinations thereof. In a further aspect, the Group 8-10 metals can comprise or can be selected from rhodium, iridium, rhodium, iridium, palladium, and/or platinum, that is, one of more than one of the so-called platinum metals.

In some aspects, the reforming catalyst can comprise any weight percentage of transition, including but not limited to, for example, from about 0.5 wt % to about 2.5 wt %, from about 0.5 wt % to about 2 wt %, or from about 0.7 wt % to about 1.5 wt % transition metal. In some embodiments, the reforming catalyst can comprise platinum in a concentration of from about 0.3 wt % to about 1.5 wt % relative to the weight of the reforming catalyst prior to reduction. In other embodiments, the reforming catalyst may comprise an inorganic support, a Group 8-10 metal, and from about 0.5 wt % to about 5.0 wt % or more of fluoride relative to the weight of the catalyst prior to reduction. In other embodiments, the reforming catalyst may comprise an inorganic support, a Group 8-10 metal, and from about 1.0 wt % to about 5.0 wt % or more of chloride relative to the weight of the catalyst prior to reduction.

Inorganic supports for aromatization catalysts can generally include any inorganic oxide. These inorganic supports include bound large pore aluminosilicates (zeolites), amorphous inorganic oxides and mixtures thereof. Large pore aluminosilicates include, but are not limited to, L-zeolite, X-zeolite, mordenite, mazzite, ZSM-5 and the like. Amorphous inorganic oxides include, but are not limited to, aluminum oxide, silicon oxide and titania. Suitable bonding agents for the inorganic supports include, but are not limited to, silica, alumina, clays, titania, magnesium oxide, and combinations thereof.

Generally, in an aspect the reforming catalyst can comprise an inorganic support comprising a crystalline or an amorphous inorganic oxide, or combinations thereof. In addition to the inorganic support comprising a zeolite or a silica-bound zeolite, the inorganic support may comprise or be selected from any of a clay mineral, silica, alumina, silica-alumina, aluminum phosphate, a heteropolytungstate, titania, zirconia, magnesia, boria, zinc oxide, mixed oxides thereof, a silica-bound zeolite, or mixtures thereof.

According to another aspect, the inorganic support of the reforming catalyst may further comprise a binder. Any weight percentage of binder disclosed herein, for example, from about 3 wt % to about 35 wt %, or from about 5 wt % to about 30 wt % binder, based on the total weight of reforming catalyst. The term "binder" is used regardless of the extent to which these oxide binder materials also function as supports for a metal catalyst, in addition to the material that is bound such as zeolites. Examples of binder-support or simply, "inorganic supports," include or comprise a silica-bound or alumina-bound L-zeolite, barium ion-exchanged L-zeolite, or K/L-zeolite. The references cited and incorporated herein by reference provide known methods for making the inorganic supports and reforming catalysts which can be used according to the disclosure. For example, in an embodiment, inorganic supports can be produced by a process that comprises, in this exemplary aspect: (a) combining the L-zeolite, barium ion-exchanged L-zeolite, or K/L-zeolite with a silica or alumina sol to form a mixture, extruding the mixture to form an extrudate, (b) drying, and calcining the extrudate to form a bound support; and (c) washing, drying, and calcining the bound support to form the inorganic support. Therefore, these inorganic supports for the reforming catalyst comprise at least one zeolite and at least one binder.

In aspects, the reforming or aromatization catalyst support may comprise a large pore zeolite. The term "large-pore zeolite" may be defined as a zeolite having an effective pore diameter of from about 6 Angstroms (Å) to about 15 Å; alternatively, from about 7 Å to about 9 Å. Examples of large pore crystalline zeolites are type L-zeolite (Zeolite L or LTL), X-zeolite (zeolite X), Y-zeolite (zeolite Y), omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, and combinations thereof. In one aspect, the large pore zeolite may comprise an isotypic framework structure. In one embodiment, the aromatization catalyst support may comprise L-zeolite.

L-Zeolite, its x-ray diffraction pattern, its properties, and methods for its preparation are described in detail in, U.S. Pat. No. 3,216,789, the content of which is incorporated herein by reference. Additional supports are described as follows: Zeolite X is described in U.S. Pat. No. 2,882,244; mazzite is described in U.S. Pat. Nos. 4,503,023 and 4,021,447; mordenite is described in U.S. Pat. No. 4,503,023; zeolite Y is described in U.S. Pat. No. 3,130,007; and each of U.S. Pat. Nos. 3,216,789; 2,882,244; 4,503,023; 4,021,447; and 3,130,007, are hereby incorporated by reference herein to demonstrate zeolites useful for aromatization processes in this disclosure.

One or more Group 8-10 metals such as platinum or other suitable metals such as rhenium can be added to the catalyst support to form a metallized catalyst support. The metal may be added to the catalyst support by employing a variety of known and conventional techniques, for example, ion-exchange, incipient wetness, pore fill, impregnation, vapor deposition, and the like. In embodiments, the platinum and optionally one or more halides may be added to the zeolite support by any suitable method, for example by impregnation with a solution of a platinum-containing compound and one or more halide-containing compounds.

In one aspect, the metal may be added to the catalyst support by impregnation with a metal-containing solution. The metal in the metal containing solution may comprise at least one metal from Group 8-10; alternatively, ruthenium, osmium, rhodium, iridium, palladium or platinum, or combinations thereof. In one embodiment, the metal may comprise platinum that may be added to the catalyst support via contact with a metal-containing solution containing at least one platinum-containing compound. Examples of suitable platinum-containing compounds for contact with the catalyst support include without limitation platinum compounds that form positively charged platinum complex ions in solution such as for example platinum salts such as chlorides and nitrates; platinum complexes with amines; or combinations thereof. For example, the platinum-containing compound can be any decomposable platinum-containing compound including, but not limited to, ammonium tetrachloroplatinate, chloroplatinic acid, diammineplatinum (II) nitrite, bis(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate. In one embodiment, the platinum source may comprise tetraamine platinum chloride (TAPC). The amount of platinum in the metallized catalyst support may range from about 0.1 to about 5 wt %; for example, from about 0.1 to about 3 wt %; for example, from about 0.3 to about 1.8 wt %. In a further aspect, the concentration of the Group 8-10 metal of the reforming catalyst can be selected independently from 0.3 wt % to 1.5 wt % relative to the weight of the catalyst prior to reduction.

In an aspect, the reforming catalyst may comprise a large pore zeolite support with a platinum-containing compound and at least one halide. One or more halides may be added to the catalyst support by contact with a halide-containing compound to form a halided supported catalyst. The halides may be added into the catalyst support separately; alternatively, the halides may be added to the catalyst support at the same time. Such halides may be incorporated during addition of a metal, alternatively, the halides may be incorporated in a separate step that may be pre- or post-addition of the metal, to form a halided, metallized catalyst support. Examples of suitable halides include without limitation fluoride, chloride, bromide, iodide, or combinations thereof. Such halides may be introduced, for example, as the ammonium halide compound.

In one embodiment, the catalyst may comprise a large pore zeolite support with a platinum-containing compound and at least one ammonium halide compound. The ammonium halide compound may comprise or be selected from one or more compounds having the formula [NR$_4$]X, where X may comprise a halide and where R represents a hydrogen or a substituted or unsubstituted hydrocarbyl moiety having from 1 to about 20 carbons, and wherein each R may be the same or different, that is, selected independently. In one embodiment, R may comprise hydrogen, methyl, ethyl, propyl, butyl, or may be combinations thereof in the formula [NR$_4$]X. Examples of a suitable organic ammonium compound of the formula [NR$_4$]X include, but are not limited to, ammonium chloride, ammonium fluoride, and tetraalkylammonium halides such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof.

In an aspect, the ammonium halide compound may comprise at least one acid halide and at least one ammonium hydroxide represented by the formula [NR'$_4$]OH, where R' may comprise or be selected independently from hydrogen or a substituted or unsubstituted hydrocarbyl moiety having from 1 to about 20 carbon atoms. Examples of suitable acid halides may include HCl, HF, HBr, HI, or combinations thereof.

Generally, and in one aspect, the aromatization catalyst in any particular catalyst bed may comprise a metallized, halided supported catalyst in which the total amount of halide in the catalyst is selected independently of the total amount of halide in any other catalyst in any other catalyst bed, and can range from about 0.05 wt % to about 6.0 wt % of the total metallized, halided supported catalyst. Alternatively, the total amount of halide in any catalyst can range, independently, from about 0.1 wt % to about 5.0 wt %, from about 0.3 wt % to about 4.0 wt %, or from about 0.5 wt % to about 3.5 wt % of the catalyst. In another aspect, any halided supported catalyst may comprise chloride present in an amount of from about 0.05 wt % to about 5 wt %; for example, from about 0.1 wt % to about 3 wt %; for example, from about 0.3 wt % to about 1.8 wt % of the catalyst. Alternatively, the total amount of halide in the catalyst can be independently selected from about 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, 4.0 wt %, 4.2 wt %, 4.4 wt %, 4.6 wt %, 4.8 wt %, 5.0 wt %, 5.2 wt %, 5.4 wt %, 5.6 wt %, 5.8 wt %, or 6.0 wt % of the catalyst.

The aromatization reactions may occur under process conditions that thermodynamically favor the dehydrocyclization (aromatization) reaction and limit the undesirable hydrocracking reactions. Operating ranges for a typical catalytic aromatization process, such as an aromatization process as disclosed herein, may include reactor inlet temperatures between about 370° C. and about 570° C., for example between about 430° C. and about 550° C.; a system pressure between about 10 pounds per square inch gauge (psig) and about 300 psig, for example from about 15 psig to about 100 psig; a hydrogen rate sufficient to yield a hydrogen to hydrocarbon mole ratio for the feed to the reforming reactor zone between about 0.1 and about 20, for example from about 3 to about 10, for example from about 1.5 to about 6; and, a liquid hourly space velocity for the hydrocarbon feed over the aromatization catalyst of between about 0.1 and about 10.

Hydrogenation Catalysts

An aspect of this disclosure provides for hydrogenating various unsaturated components to generate the saturated compounds and mixtures of compounds that can be used in sustainable jet fuel. This disclosure and the claims refer to a first, a second, and a third hydrogenation catalyst primarily for antecedent basis reasons, and in any of the disclosed hydrogenation processes, any hydrogenation catalyst can be used. In an aspect, what is referred to generally as the first hydrogenation catalyst is for hydrogenation of the second oligomerization product comprising $C_{16-}$ olefins provide a first $C_{16-}$ paraffin stream. In another aspect, what is referred to generally as the second hydrogenation catalyst is for hydrogenation of the second portion of the first oligomerization product comprising at least one $C_8$ to $C_{16}$ alpha-olefin to provide a second $C_{16-}$ paraffin stream. In a further aspect, what is referred to generally as the third hydrogenation catalyst is used for hydrogenating at least a portion of the $C_6$ to $C_8$ aromatic hydrocarbon stream which is separated from the first oligomerization product to form a $C_6$ to $C_8$ cycloparaffin stream. However again, any hydrogenation catalyst can be used for the first, the second, and the third hydrogenation catalysts. Therefore, any of the first, the second, and the third hydrogenation catalysts can be the same, and any of the first, the second, and the third hydrogenation catalysts can differ from the other two. Reference to simply "a" or "the" hydrogenation catalyst is intended to reflect any of the first, the second, and/or the third hydrogenation catalysts.

Accordingly, an aspect of this disclosure provides for hydrogenating the unsaturated olefin oligomers and the aromatic compounds that are produced using an bio-ethylene feed to make components for use in a sustainable jet fuel. For example, any $C_{16-}$ olefin stream may be hydrogenated in the presence of a hydrogenation catalyst to provide a $C_{16-}$ paraffin stream, and the $C_6$ to $C_8$ aromatic hydrocarbon stream may be hydrogenated in the presence of a hydrogenation catalyst to form a $C_6$ to $C_8$ cycloparaffin stream. Therefore, while some unsaturated compounds, particularly aromatics, are useful components of jet fuel, most of the oligomerization products and the aromatization products can be hydrogenated to form the paraffins and cycloparaffins that make up the majority of the jet fuel.

Hydrogenation of olefins and aromatics is well understood, and any hydrogenation catalyst can be used in the hydrogenation of any of unsaturated composition or stream, such as the $C_4$ to $C_{16}$ alpha-olefins, the second oligomerization product comprising $C_{16-}$ olefins, the $C_6$ to $C_8$ aromatic hydrocarbon stream, or any unsaturated component of this process. For example, in an aspect, the hydrogenation catalyst can comprise, consist essentially of, or be a nickel or a nickel-containing hydrogenation catalyst, a platinum or a platinum-containing hydrogenation catalyst, or a palladium or a palladium-containing hydrogenation catalyst.

The hydrogenation catalyst can comprise, consist essentially of, or can be: (a) a heterogeneous catalyst selected from a Group 8-12 metal deposited on a carrier selected from carbon, silica, alumina, silica-alumina, a zeolite, or calcium carbonate; or (b) a homogeneous catalysts selected from (i) a Ziegler catalysts comprising an organic salt of a Group 6-10 metal and an organoaluminum compound, or (ii) a coordination compound of Ru, Rh, or Ir, or (iii) a Group 4 metal organometallic compound. In this aspect: (a) the Group 8-12 metal of the heterogeneous catalysts can be selected from Fe, Co, Ni, Cu, Zn, Ru, Rh, Pd, Ir, or Pt; (b) the Group 6-10 metal of the homogeneous catalyst can be selected from Ni, Co, Fe, or Cr; or (c) the Group 4 metal organometallic compound can be selected from a Group 4 metallocene compound. For example, in embodiments, the hydrogenation catalyst can comprise one or more metals selected from cobalt, molybdenum, nickel or tungsten.

Biomass Ethanol and Dehydration of Biomass Ethanol to Bio-Ethylene

Biomass ethanol produced by any process can be used according to this disclosure. Biomass ethanol, including the fuel ethanol for blending with gasoline, is largely produced by fermenting the grain starch and sugars from sources such as corn, sorghum, and barley. Other feedstocks for the production of biomass ethanol include agriculture residues such as corn stalks, rice stalks, and grasses such as switchgrass, and ethanol from these sources is also termed cellulosic ethanol as it derives from lignocellulosic biomass. Microorganisms such as yeast (e.g., *Saccharomyces* species) can be employed to produce ethanol via fermentation of sugars, either directly extracted from sources such as sugarcanes and sugar beet juices or obtained via hydrolysis of starchy materials such as corn and grains. Bacteria (e.g., *Zymomonas* species) and molds (e.g., *Mucor* species) may also be used to produce biomass ethanol. The ethanol produced in this manner can then be separated by distillation.

Gas obtained from a biomass feedstock is primarily a gaseous mixture of methane and carbon dioxide, with traces of other gases. This bio-syngas can be can be produced by the thermal gasification (in gasifiers) of various organic feedstocks. This bio-syngas may also be termed biosynthetic gas bio-SNG.

In an aspect, the biomass ethanol according to this disclosure can be produced from a starch-based feedstock, a sugar-based feedstock, or a cellulosic feedstock, or is produced from a bio-syngas to ethanol process. For example, the biomass ethanol can be produced by the fermentation of sugars derived from a starch-based feedstock or a sugar-based feedstock. The biomass ethanol also may be produced by the fermentation of a carbohydrate derived from a starch-based feedstock, a sugar-based feedstock, or a cellulosic feedstock. For example, suitable starch-based feedstocks include barley, cassava root, corn, potato, rice, sorghum grain, sweet potato, wheat, rye, or any combination thereof. In another aspect, suitable sugar-based feedstocks can include sugar cane, sugar beet, sweet sorghum, molasses, fruit, or any combination thereof.

The biomass ethanol also can be produced from a starch-based feedstock by a process comprising the enzymatic hydrolysis of the starch-based feedstock to produce sugars, followed by yeast fermentation of the sugars. In another aspect, the biomass ethanol can be produced from cellulosic feedstock. In this aspect, the cellulosic feedstock can comprise or be selected from corn stover, wheat straw, sugar cane bagasse, switchgrass, or wood chips, or any combination thereof.

The dehydration of the biomass ethanol to bio-ethylene can comprise simply contacting the biomass ethanol with a dehydration catalyst under conditions suitable to form bio-ethylene. For example, the dehydration of the biomass ethanol can comprise passing liquid phase ethanol through a bed comprising the dehydration catalyst. This process can further comprise regenerating the dehydration catalyst by heating the catalyst after use at atmosphere pressure or at reduced pressure.

In an aspect, the dehydration catalyst which can converts biomass ethanol to bio-ethylene can comprise, consist essentially of, or can be selected from alumina, silica gel, silica-alumina, a crystalline silicate, a dealuminated crystalline silicate, a phosphorus-modified crystalline silicate, a zeolite, a molecular sieve, or anhydrous calcium sulfate, or combinations thereof. In aspects, the dehydration catalyst can comprise, consist essentially of, or can be a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst. For example, in an aspect, the dehydration catalyst can comprise, consist essentially of, or can be a ZSM-5 zeolite comprising from 0.1 wt % to 0.5 wt % of lanthanum and from 0.01 wt % to 1 wt % phosphorous, relative to the weight of the catalyst, wherein the ZSM-5 has a silica to alumina molar ratio of, for example, 20 to 45.

EXAMPLES

The present disclosure is further illustrated by the following examples, which are not to be construed in any way as imposing limitations upon the scope of the invention. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

Example 1

Bio-derived ethanol is introduced to a reaction step to produce a bio-derived ethylene. The bio-ethylene is separated and purified sufficiently before being introduced into a reaction step using a chromium pyrrole-based oligomerization catalyst. This oligomerization produces greater than 90% 1-hexene product and an 5-8% mixed olefins stream containing mostly molecules comprised of 10 carbon atoms. The combined reactor effluent is then fed to a hydrogenation reactor and separated into a n-hexane stream and a mixed 10-carbon molecule stream. The n-hexane stream is fed to an AROMAX® catalyst-based unit to produce benzene and hydrogen, and the benzene is converted to mixed aromatics and blended or further hydrogenated to paraffinic cyclic compounds. These paraffinic cyclic compounds are then blended with the mixed 10 carbon molecule stream to produce the desired sustainable aviation fuel blendstock.

Example 2

Bio-derived ethanol is introduced to a reaction step to produce a bio-derived ethylene. The ethylene is separated and purified sufficiently before being introduced into a reaction step using a triethylaluminum-based oligomerization catalyst which produces a range of alpha-olefin molecules. This range of alpha-olefin molecules chiefly comprise $C_{10}$-$C_{16}$ olefins which are separated from the $C_4$-$C_6$ olefins, with each stream containing a portion of the $C_8$ molecules. The $C_4$-$C_6$ stream is then fed to a catalytic step capable of dimerization/trimerization to produce additional alpha-olefin molecules in the $C_{10}$-$C_{16}$ range. The $C_{10}$-$C_{16}$ molecules from these two streams are combined and hydrogenated to produce the desired SAF blendstock with up to 80% carbon selectivity from the bio-ethylene.

Aspects of the Disclosure

The invention is described above with reference to numerous aspects, embodiments, and specific examples. Many variations will suggest themselves to those skilled in the art in light of the above detailed description. All such obvious variations are within the full intended scope of the appended claims. Other aspects of the invention can include, but are not limited to, the following. Aspects which are described as "comprising" certain components or steps, may also "consist essentially of" or "consist of" those components or steps, unless stated otherwise.

Aspect 1. A process for making a sustainable jet fuel, the process comprising:
(a) providing a bio-ethylene feed, at least a portion of which is derived from a biomass ethanol or a bio-syngas ethanol;
(b) contacting the bio-ethylene feed with a first oligomerization catalyst system to form a first oligomerization product comprising at least one $C_4$ to $C_{16}$ alpha-olefin;
(c) contacting at least a first portion of the first oligomerization product with a second oligomerization catalyst system to provide a second oligomerization product comprising $C_{16-}$ olefins; and
(d) hydrogenating the second oligomerization product in the presence of a first hydrogenation catalyst to provide a first $C_{16-}$ paraffin stream.

Aspect 2. The process for making a sustainable jet fuel according to Aspect 1, further comprising:
(i) separating a second portion of the first oligomerization product comprising at least one $C_8$ to $C_{16}$ alpha-olefin from the first oligomerization product, prior to contacting the first oligomerization product with the second oligomerization catalyst system.

Aspect 3. The process for making a sustainable jet fuel according to Aspect 2, further comprising:
(ii) combining the second portion of the first oligomerization product with the second oligomerization product prior to hydrogenating the second oligomerization product in the presence of a first hydrogenation catalyst;
wherein hydrogenating the second oligomerization product comprises hydrogenating the combined first oligomerization product and second oligomerization product to provide the first $C_{16-}$ paraffin stream.

Aspect 4. The process for making a sustainable jet fuel according to Aspect 2, further comprising:

(ii) hydrogenating the second portion of the first oligomerization product in the presence of a second hydrogenation catalyst to provide a second $C_{16-}$ paraffin stream.

Aspect 5. The process for making a sustainable jet fuel according to Aspect 4, further comprising:
(iii) combining the first $C_{16-}$ paraffin stream and the second $C_{16-}$ paraffin stream.

Aspect 6. The process for making a sustainable jet fuel according to any preceding Aspect, wherein the at least one $C_4$ to $C_{16}$ alpha-olefin comprises, consists essentially of, or is selected from $C_4$ to $C_{14}$ alpha-olefins, $C_6$ to $C_8$ alpha-olefins, $C_6$ plus $C_{10}$ alpha-olefins, $C_6$ to $C_{10}$ alpha-olefins, or any combination thereof.

Aspect 7. The process for making a sustainable jet fuel according to any preceding Aspect, further comprising:
using the first $C_{16-}$ paraffin stream, the second $C_{16-}$ paraffin stream, or the combined first and second $C_{16-}$ paraffin streams as a component to form a sustainable jet fuel.

Aspect 8. The process for making a sustainable jet fuel according to any preceding Aspect, further comprising:
(i) separating a $C_6$ to $C_8$ aliphatic hydrocarbon stream comprising at least one $C_6$ to $C_8$ alpha-olefin and/or $C_6$ to $C_8$ paraffin from the first oligomerization product;
(ii) contacting the $C_6$ to $C_8$ aliphatic hydrocarbon stream with a reforming catalyst to provide a $C_6$ to $C_8$ aromatic hydrocarbon stream; and
(iii) hydrogenating at least a portion of the $C_6$ to $C_8$ aromatic hydrocarbon stream in the presence of a third hydrogenation catalyst to form a $C_6$ to $C_8$ cycloparaffin stream.

Aspect 9. The process for making a sustainable jet fuel according to Aspect 8, further comprising:
(iv) using the $C_6$ to $C_8$ cycloparaffin stream, the $C_6$ to $C_8$ aromatic hydrocarbon stream, or both as components to form a sustainable jet fuel.

Aspect 10. The process for making a sustainable jet fuel according to any of Aspects 8-9, wherein:
step (i) of separating the $C_6$ to $C_8$ aliphatic hydrocarbon stream from the first oligomerization product provides an alpha-olefin raffinate comprising at least one $C_4$ and $C_{10}$-$C_{16}$ alpha-olefin; and
step (c) of contacting at least the first portion of the first oligomerization product with the second oligomerization catalyst system comprises contacting the alpha-olefin raffinate with the second oligomerization catalyst system to provide the second oligomerization product comprising $C_{16-}$ olefins.

Aspect 11. A process for making a sustainable jet fuel, the process comprising:
(a) providing a bio-ethylene feed, at least a portion of which is derived from a biomass ethanol or a bio-syngas ethanol;
(b) contacting the bio-ethylene feed with a first oligomerization catalyst system to form a first oligomerization product comprising at least one $C_4$ to $C_{16}$ alpha-olefin;
(c) separating a $C_6$ to $C_8$ aliphatic hydrocarbon stream comprising at least one $C_6$ to $C_8$ alpha-olefin and/or $C_6$ to $C_8$ paraffin from the first oligomerization product; and
(d) contacting the $C_6$ to $C_8$ aliphatic hydrocarbon stream with a reforming catalyst to provide a $C_6$ to $C_8$ aromatic hydrocarbon stream.

Aspect 12. The process for making a sustainable jet fuel according to Aspect 11, further comprising:
(e) using the $C_6$ to $C_8$ aromatic hydrocarbon stream as a component to form a sustainable jet fuel.

Aspect 13. A process for making a sustainable jet fuel, the process comprising:
(a) providing a bio-ethylene feed, at least a portion of which is derived from a biomass ethanol or a bio-syngas ethanol;
(b) contacting the bio-ethylene feed with a first oligomerization catalyst system to form a first oligomerization product comprising at least one $C_4$ to $C_{16}$ alpha-olefin;
(c) separating a $C_6$ to $C_8$ aliphatic hydrocarbon stream comprising at least one $C_6$ to $C_8$ alpha-olefin and/or $C_6$ to $C_8$ paraffin from the first oligomerization product;
(d) contacting the $C_6$ to $C_8$ aliphatic hydrocarbon stream with a reforming catalyst to provide a $C_6$ to $C_8$ aromatic hydrocarbon stream; and
(e) hydrogenating the $C_6$ to $C_8$ aromatic hydrocarbon stream in the presence of a third hydrogenation catalyst to form a $C_6$ to $C_8$ cycloparaffin stream.

Aspect 14. The process for making a sustainable jet fuel according to Aspect 13, further comprising:
(f) using the $C_6$ to $C_8$ cycloparaffin stream as a component to form a sustainable jet fuel.

Aspect 15. A process for making a sustainable jet fuel, the process comprising:
(a) providing a bio-ethylene feed, at least a portion of which is derived from a biomass ethanol or a bio-syngas ethanol;
(b) contacting the bio-ethylene feed with a first oligomerization catalyst system to form a first oligomerization product comprising at least one $C_4$ to $C_{16}$ alpha-olefin;
(c) separating a $C_6$ to $C_8$ aliphatic hydrocarbon stream comprising at least one $C_6$ to $C_8$ alpha-olefin and/or $C_6$ to $C_8$ paraffin from the first oligomerization product, providing an alpha-olefin raffinate comprising at least one $C_4$ and/or $C_{10}$-$C_{16}$ alpha-olefin;
(d) contacting the $C_6$ to $C_8$ aliphatic hydrocarbon stream with a reforming catalyst to provide a $C_6$ to $C_8$ aromatic hydrocarbon stream;
(e) hydrogenating at least a portion of the $C_6$ to $C_8$ aromatic hydrocarbon stream in the presence of a third hydrogenation catalyst to form a $C_6$ to $C_8$ cycloparaffin stream;
(f) contacting the alpha-olefin raffinate with a second oligomerization catalyst system to provide a second oligomerization product comprising $C_{16-}$ olefins;
(g) hydrogenating the second oligomerization product in the presence of a first hydrogenation catalyst to provide a first $C_{16-}$ paraffin stream.

Aspect 16. The process for making a sustainable jet fuel according to Aspect 15, further comprising:
(h) using the $C_6$ to $C_8$ aromatic hydrocarbon stream, the $C_6$ to $C_8$ cycloparaffin stream, and/or the first $C_{16-}$ paraffin stream as components to form a sustainable jet fuel.

Aspect 17. The process for making a sustainable jet fuel according to any of Aspects 1-16, wherein the steps of contacting the bio-ethylene feed with the first oligomerization catalyst system and contacting the first oligomerization product with the second oligomerization catalyst system are carried out in the same reactor.

Aspect 18. The process for making a sustainable jet fuel according to any of Aspects 1-16, wherein the steps of contacting the bio-ethylene feed with the first oligomerization catalyst system and contacting the first oligomerization product with the second oligomerization catalyst system are carried out in different reactors.

Aspect 19. The process for making a sustainable jet fuel according to any of the preceding Aspects, wherein the sustainable jet fuel is a $C_8$-$C_{16}$ kerosene-type jet fuel.

Aspect 20. The process for making a sustainable jet fuel according to any of the preceding Aspects, wherein the sustainable jet fuel is a $C_5$-$C_{15}$ naphtha-type jet fuel.

Aspect 21. The process for making a sustainable jet fuel according to any of Aspects 1-20, wherein the sustainable jet fuel or the component thereof is not further purified.

Aspect 22. The process for making a sustainable jet fuel according to any of Aspects 1-20, wherein the sustainable jet fuel or the component thereof is further purified.

Aspect 23. The process for making a sustainable jet fuel according to any of the preceding Aspects, wherein the sustainable jet fuel or the component thereof is blended with a non-sustainable jet fuel.

Aspect 24. The process for making a sustainable jet fuel according to any of the preceding Aspects, further comprising certifying the sustainable jet fuel as compliant with the Carbon Offsetting and Reduction Scheme for International Jet (CORSIA) sustainability criteria in accordance with the International Sustainability and Carbon Certification (ISCC) CORSIA certification system.

Aspect 25. The process for making a sustainable jet fuel according to any of the preceding Aspects, further comprising certifying the sustainable jet fuel as a Lower Carbon Jet Fuel (LCAF) in accordance with the International Sustainability and Carbon Certification (ISCC) LCAF certification system.

Aspect 26. The process for making a sustainable jet fuel according to any of Aspects 24-25, wherein the step of certifying is based upon the weight or fraction of the sustainable jet fuel attributable to the biomass ethanol determined by mass balance and the free attribution method.

Aspect 27. The process for making a sustainable jet fuel according to any of the preceding Aspects, wherein: (a) the $C_4$ to $C_{16}$ alpha-olefins comprise 1-butene, 1-hexene, 1-octene, 2-butyl-1-hexene, 3-propyl-1-heptene, 4-ethyl-1-octene, 5-methyl-1-nonene, 1-decene, 1-dodecene, or any combinations thereof; and (b) optionally, the $C_4$ to $C_{16}$ alpha-olefins comprise $C_{14}$ olefins, $C_{16}$ olefins, or a combination thereof.

Aspect 28. The process for making a sustainable jet fuel according to any of the preceding Aspects, wherein the first oligomerization product comprises 1-butene, 1-hexene, 1-octene, 2-butyl-1-hexene, 3-propyl-1-heptene, 4-ethyl-1-octene, 5-methyl-1-nonene, 1-decene, 1-dodecene, n-butane, n-hexane, n-octane, 5-methyl-nonane, 4-ethyl-octane, n-decane, n-dodecene, or any combinations thereof.

Aspect 29. The process for making a sustainable jet fuel according to any of the preceding Aspects, wherein the first oligomerization product comprises or further comprises 1-pentene, 1-heptene, 4-decene, 5-decene, 1-tetradecene, n-tetradecane, or any combinations thereof.

Aspect 30. The process for making a sustainable jet fuel according to any of the preceding Aspects, wherein the first oligomerization product comprises at least about 50 wt. % 1-butene, at least about 50 wt. % 1-hexene, or at least about 50 wt. % 1-octene.

Aspect 31. The process for making a sustainable jet fuel according to any of the preceding Aspects, wherein the second oligomerization product comprises: (a) 1-butene, 1-hexene, 1-octene, 2-butyl-1-hexene, 3-propyl-1-heptene, 4-ethyl-1-octene, 5-methyl-1-nonene, 4-decene, 5-decene, 1-dodecene, 1-tetradecene, 1-hexadecene, or any combinations thereof; or (b) 1-octene, 2-butyl-1-hexene, 3-propyl-1-heptene, 4-ethyl-1-octene, 5-methyl-1-nonene, 4-decene, 5-decene, 1-dodecene, 1-tetradecene, 1-hexadecene, or any combinations thereof.

Aspect 32. The process for making a sustainable jet fuel according to any of the preceding Aspects, wherein the first $C_{16-}$ paraffin stream, the second $C_{16-}$ paraffin stream, or both the first and second $C_{16-}$ paraffin streams comprise $C_{16-}$ n-alkanes and $C_{16-}$ iso-alkanes.

Aspect 33. The process for making a sustainable jet fuel according to any of the preceding Aspects, wherein the first $C_{16-}$ paraffin stream, the second $C_{16-}$ paraffin stream, or both the first and second $C_{16-}$ paraffin streams comprise (a) $C_8$ to $C_{16}$ n-alkanes and $C_8$ to $C_{16}$ iso-alkanes or (b) $C_{12}$ to $C_{16}$ n-alkanes and $C_{12}$ to $C_{16}$ iso-alkanes.

Aspect 34. The process for making a sustainable jet fuel according to any of the preceding Aspects, wherein the $C_6$ to $C_8$ aliphatic hydrocarbon stream comprising $C_6$ to $C_8$ alpha-olefins and paraffins comprises 1-hexene, 1-heptene, 1-octene, 2-ethyl-1-butene, 2-methyl-1-pentene, 3-methyl-1-pentene, 4-methyl-1-pentene, 2-methyl-1-hexene, 3-methyl-1-hexene, 4-methyl-1-hexene, 5-methyl-1-hexene, 2-ethyl-1-pentene, 3-ethyl-1-pentene, 2-ethyl-1-hexene, 3-ethyl-1-hexene, 4-ethyl-1-hexene, or any combinations thereof.

Aspect 35. The process for making a sustainable jet fuel according to any of the preceding Aspects, wherein the $C_6$ to $C_8$ aromatic hydrocarbon stream comprises benzene, toluene, ethylbenzene, o-xylene, m-xylene, p-xylene, or any combinations thereof.

Aspect 36. The process for making a sustainable jet fuel according to any of the preceding Aspects, wherein the $C_4$ and/or $C_{10}$-$C_{16}$ alpha-olefin raffinate comprises from 1 wt. % to 15 wt. % decenes.

Aspect 37. The process for making a sustainable jet fuel according to any of the preceding Aspects, wherein the $C_4$ and/or $C_{10}$-$C_{16}$ alpha-olefin raffinate comprises 2-butyl-1-hexene, 3-propyl-1-heptene, 4-ethyl-1-octene, 5-methyl-1-nonene, 4-decene, 5-decene, or any combination thereof.

Aspect 38. The process for making a sustainable jet fuel according to any of the preceding Aspects, wherein the first oligomerization catalyst system and the second oligomerization catalyst system, independently, comprise a chromium-based catalyst, a metallocene-based catalyst, a Ziegler-Natta based catalyst, tungstated zirconium, molybdenum zirconium, nickel and/or cobalt doped tungstated zirconium, nickel and/or cobalt doped molybdenum zirconium catalysts, a Group 3 to Group 12 metal-treated zeolite, molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof.

Aspect 39. The process for making a sustainable jet fuel according to any preceding Aspect, wherein the first oligomerization catalyst system and the second oligomerization catalyst system, independently, further comprises an organometal compound which comprises, consists essentially of, or is an organoaluminum compound, an organoaluminoxane, an organoboron compound, an organozinc compound, an organomagnesium compound, an organolithium compound, or any combination thereof.

Aspect 40. The process for making a sustainable jet fuel according to any preceding Aspect, wherein the first oligomerization catalyst system and the second oligomerization catalyst system, independently, further comprises an organometal compound having the general formula: (a) $M^3(X^{10})_n(X^{11})_{3-n}$, wherein $M^3$ is boron or aluminum and n is from 1 to 3 inclusive; (b) $M^4(X^{10})_n(X^{11})_{2-n}$, wherein $M^4$ is magnesium or zinc and n is from 1 to 2 inclusive; or (c) $M^5X^{10}$, wherein $M^5$ is Li; wherein $X^{10}$ is independently hydride or a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide.

Aspect 41. The process for making a sustainable jet fuel according to any of the preceding Aspects, wherein the first oligomerization catalyst system or the second oligomerization catalyst system, independently, further comprises hydrogen.

Aspect 42. The process for making a sustainable jet fuel according to any of the preceding Aspects, wherein the first oligomerization catalyst system or the second oligomerization catalyst system, independently, further comprises hydrogen at partial pressure of from 2 psi to 100 psi; 5 psi to 75 psi; or 10 psi to 50 psi.

Aspect 43. The process for making a sustainable jet fuel according to any of Aspects 38-42, or any of the preceding Aspects, wherein the first oligomerization catalyst system and the second oligomerization catalyst system, independently, comprises or consists essentially of a chromium-based catalyst.

Aspect 44. The process for making a sustainable jet fuel according to any of Aspects 38-43, or any of the preceding Aspects, wherein the chromium-based catalyst comprises (a) a chromium-containing compound, (b) a heteroatomic ligand, and (c) optionally, a diluent.

Aspect 45. The process for making a sustainable jet fuel according to any of Aspects 38-44, or any of the preceding Aspects, wherein the chromium-based catalyst further comprises an organometal compound, such as an organoaluminum compound.

Aspect 46. The process for making a sustainable jet fuel according to any of Aspects 44-45, or any of the preceding Aspects, wherein the heteroatomic ligand is a separate component of the first oligomerization catalyst system and the second oligomerization catalyst system or is a ligand complexed to the chromium-containing compound of the first oligomerization catalyst system and the second oligomerization catalyst system.

Aspect 47 The process for making a sustainable jet fuel according to any of the preceding Aspects, wherein the first oligomerization catalyst system and the second oligomerization catalyst system, independently, comprise, consist essentially of, or are selected from:
  (a) a chromium-containing compound, a pyrrole compound, an organoaluminum compound, and optionally a halide containing compound;
  (b) a chromium-containing compound, a diphosphino aminyl compound, an organoaluminum compound;
  (c) a chromium-containing compound complexed to a diphosphino aminyl compound, and an organoaluminum compound;
  (d) a chromium-containing compound, an $N^2$-phosphinyl amidine compound, and an organoaluminum compound;
  (e) a chromium-containing compound complexed to an $N^2$-phosphinyl amidine compound, and an organoaluminum compound;
  (f) a chromium-containing compound, an $N^2$-phosphinyl formamidine compound, an organoaluminum compound;
  (g) a chromium-containing compound complexed to an $N^2$-phosphinyl formamidine compound, and an organoaluminum compound; or
  (h) any combinations thereof.

Aspect 48. The process for making a sustainable jet fuel according to any of Aspects 44-47, wherein:
  (a) the chromium-containing compound is selected from chromium(II) nitrate, chromium(II) sulfate, chromium (II) fluoride, chromium(II) chloride, chromium(II) bromide, chromium(II) iodide, chromium(III) nitrate, chromium(III) sulfate, chromium(III) fluoride, chromium(III) chloride, chromium(III) bromide, or chromium(III) iodide; or
  (b) the chromium-containing compound is selected from a chromium(II) carboxylate, a chromium(II) alkoxide, chromium(II) aryloxide, a chromium(II) beta-dionate (i.e. beta-diketonate), a chromium(III) carboxylate, a chromium(III) alkoxide, chromium(III) aryloxide, or a chromium(III) beta-dionate (i.e. beta-diketonate); wherein
  each carboxylate group of the chromium-containing compound independently can be a $C_2$ to $C_{24}$ carboxylate group, a $C_4$ to $C_{19}$ carboxylate group, or a $C_5$ to $C_{12}$ carboxylate group;
  each alkoxide group of the chromium-containing compound independently can be a $C_1$ to $C_{24}$ alkoxy group, a $C_4$ to $C_{19}$ alkoxy group, or a $C_5$ to $C_{12}$ alkoxy group;
  each aryloxide group of the chromium-containing compound independently can be a $C_6$ to $C_{24}$ aryloxy group, a $C_6$ to $C_{19}$ aryloxy group, or a $C_6$ to $C_{12}$ aryloxy group; and
  each beta-dionate group of the chromium-containing compound independently can be a $C_5$ to $C_{24}$ beta-dionate group, a $C_5$ to $C_{19}$ beta-dionate group, or a $C_5$ to $C_{12}$ beta-dionate group.

Aspect 49. The process for making a sustainable jet fuel according to any of the preceding Aspects, wherein the first oligomerization catalyst system, the second oligomerization catalyst system, or both independently comprise a chromium carboxylate comprising, consisting essentially of, or selected from chromium(II) acetate, chromium(II) propionate, chromium(II) butyrate, chromium(II) isobutyrate, chromium(II) neopentanoate, chromium(II) oxalate, chromium(II) octanoate, chromium(II) 2-ethylhexanoate, chromium(II) laurate, or chromium(II) stearate, chromium(III) acetate, chromium(III) propionate, chromium(III) butyrate, chromium(III) isobutyrate, chromium(III) neopentanoate, chromium(III) oxalate, chromium(III) octanoate, chromium (III) 2-ethylhexanoate, chromium(III) 2,2,6,6-tetramethylheptanedionate, chromium(III) naphthenate, chromium(III) laurate, or chromium(III) stearate.

Aspect 50. The process for making a sustainable jet fuel according to any of Aspects 44-49, wherein the heteroatomic ligand can comprise, can consist essentially of, or can be, an amine compound, an amide compound, an imide compound, or combinations thereof.

Aspect 51. The process for making a sustainable jet fuel according to any of Aspects 44-50, wherein the heteroatomic ligand can comprise, can consist essentially of, or can be:
  (a) a $C_2$ to $C_{30}$ amine; alternatively, a $C_2$ to $C_{20}$ amine; alternatively, $C_2$ to $C_{15}$ amine; or alternatively, a $C_2$ to $C_{10}$ amine;
  (b) a $C_3$ to $C_{30}$ amide; alternatively, a $C_3$ to $C_{20}$ amide; alternatively, $C_3$ to $C_{15}$ amide; or alternatively, a $C_3$ to $C_{10}$ amide; or (c) a $C_4$ to $C_{30}$ imide; alternatively, a $C_4$ to $C_{20}$ imide; alternatively, $C_4$ to $C_{15}$ imide; or alternatively, a $C_4$ to $C_{10}$ imide.

Aspect 52. The process for making a sustainable jet fuel according to any of Aspects 44-49, wherein the heteroatomic ligand can comprise, can consist essentially of, or can be, a pyrrole compound, a diphosphino aminyl compound, an $N^2$-phosphinyl amidine compound, an $N^2$-phosphinyl formamidine compound, or combinations thereof.

Aspect 53. The process for making a sustainable jet fuel according to any of Aspects 44-49 and 52, wherein the heteroatomic ligand can comprise, can consist essentially of, or can be:
(a) any pyrrole compound that can form a chromium pyrrolide complex; or
(b) pyrrole ($C_5H_5N$), an analog or derivative of pyrrole (e.g., indole), a substituted pyrrole, or a metal pyrrolide compound; or
(c) pyrrole or any heteroleptic or homoleptic metal complex or salt containing a pyrrolide radical or ligand; or
(b) a $C_4$ to $C_{30}$ pyrrole; alternatively, a $C_4$ to $C_{20}$ pyrrole; alternatively, $C_4$ to $C_{15}$ pyrrole; or alternatively, a $C_4$ to $C_{10}$ pyrrole.

Aspect 54. The process for making a sustainable jet fuel according to any of Aspects 44-49 and 52-53, wherein the heteroatomic ligand can comprise, can consist essentially of, or can be a pyrrole compound, and the pyrrole compound can have Formula P1 or Formula II:

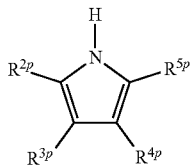

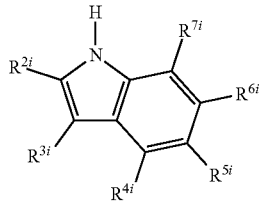

wherein: $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula II can each independently be:
hydrogen, a $C_1$ to $C_{18}$ organyl group, a $C_1$ to $C_{18}$ hydrocarbyl group, or a $C_3$ to $C_{60}$ silyl group;
alternatively, hydrogen, a $C_1$ to $C_{15}$ organyl group, a $C_1$ to $C_{15}$ hydrocarbyl group, or a $C_3$ to $C_{45}$ silyl group;
alternatively, hydrogen, a $C_1$ to $C_{10}$ organyl group, a $C_1$ to $C_{10}$ hydrocarbyl group, or a $C_3$ to $C_{30}$ silyl group;
alternatively, hydrogen, a $C_1$ to $C_5$ organyl group, a $C_1$ to $C_5$ hydrocarbyl group, or a $C_3$ to $C_{15}$ silyl group.

Aspect 55. The process for making a sustainable jet fuel according to any of Aspects 44-49 and 52-54, wherein the heteroatomic ligand can comprise, can consist essentially of, or can be a pyrrole compound, and the pyrrole compound can be selected from pyrrole, 2,5-dimethylpyrrole, 2-methyl-5-ethylpyrrole, 2-methyl-5-propylpyrrole, 2,5-diethylpyrrole, 3,4-dimethylpyrrole, 2,5-di-n-propylpyrrole, 2,5-di-n-butylpyrrole, 2,5-di-n-pentylpyrrole, 2,5-di-n-hexylpyrrole, 2,5-di-n-heptylpyrrole, 2,5-di-n-octylpyrrole, 2,5-dibenzylpyrrole, 2,4-dimethyl-3-ethylpyrrole, 2,3,5-triethylpyrrrole, 2,3,5-tri-n-butylpyrrrole, 2,3,5-tri-n-pentylpyrrrole, 2,3,5-tri-n-hexylpyrrrole, 2,3,5-tri-n-heptylpyrrrole, 2,3,5-tri-n-octylpyrrrole, 2,3,4,5-tetraethylpyrrole, 2,3,4,5-tetra-n-butylpyrrole, 2,3,4,5-tetra-n-hexylpyrrole, 2,5-bis(2',2',2'-trifluoroethyl)pyrrole, 2,5-bis(2'-methoxymethyl)pyrrole, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neopentylpyrrole, 2-ethyl-4-neopentylpyrrole, 3,4-diisopropylpyrrole, 3,4-di-sec-butylpyrrole, 3,4-diisobutylpyrrole, 3,4-di-t-butylpyrrole, 3,4-di-neopentylpropylpyrrole, tetrahydroindole, dipyrrolylmethane, indole, 3,4-dichloropyrrole, 2,3,4,5-tetrachloropyrrole, pyrrole-2-carboxylic acid, 2-acetylpyrrole, pyrrole-2-carboxaldehyde, 3-acetyl-2,4-dimethylpyrrole, ethyl-2,4-dimethyl-5-(ethoxycarbonyl)-3-pyrrole-propionate, or ethyl-3,5-dimethyl-2-pyrrolecarboxylate.

Aspect 56. The process for making a sustainable jet fuel according to Aspects 44-49 and 52-55, wherein the heteroatomic ligand can comprise, can consist essentially of, or can be a pyrrole compound, and the pyrrole compound can comprise, can consist essentially of, or can be:
(a) a metal pyrrolide, such as an alkyl metal pyrrolide;
(b) a diorganoaluminum pyrrolide of any pyrrole provided herein;
(c) diethylaluminum 2,5-dimethylpyrrolide, ethylaluminum di(2,5-dimethylpyrrolide), aluminum tri(2,5-dimethylpyrrolide), or combinations thereof.

Aspect 57. The process for making a sustainable jet fuel according to any of Aspects 44-49 and 52, wherein the heteroatomic ligand can comprise, can consist essentially of, or can be, a diphosphino aminyl compound (i.e. a compound comprising a P—N—P (phosphorus-nitrogen-phosphorus) linkage).

Aspect 58. The process for making a sustainable jet fuel according to any of Aspects 44-49, 52, and 57, wherein the heteroatomic ligand can comprise, can consist essentially of, or can be a diphosphino aminyl moiety having Structure PNP2:

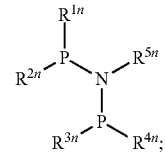

wherein the $R^{1n}$, $R^{2n}$, $R^{3n}$, $R^{4n}$, and/or $R^{5n}$, independently can be:
(a) a $C_1$ to $C_{30}$ organyl group; alternatively, a $C_1$ to $C_{20}$ organyl group; alternatively, a $C_1$ to $C_{15}$ organyl group; alternatively, a $C_1$ to $C_{10}$ organyl group; or alternatively, a $C_1$ to $C_5$ organyl group;
(b) a $C_1$ to $C_{30}$ organyl group comprising inert functional groups; alternatively, a $C_1$ to $C_{20}$ organyl group comprising inert functional groups; alternatively, a $C_1$ to $C_{15}$ organyl group comprising inert functional groups; alternatively, a $C_1$ to $C_{10}$ organyl group comprising inert functional groups; or alternatively, a $C_1$ to $C_5$ organyl group comprising inert functional groups;
(c) a $C_1$ to $C_{30}$ hydrocarbyl group; alternatively, a $C_1$ to $C_{20}$ hydrocarbyl group; alternatively, a $C_1$ to $C_{15}$ hydrocarbyl group; alternatively, a $C_1$ to $C_{10}$ hydrocarbyl group; or alternatively, a $C_1$ to $C_5$ hydrocarbyl group;
(d) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group;
(e) a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(f) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; alternatively, a phenyl group or a $C_6$ to $C_{10}$ substituted phenyl group; or alternatively, a phenyl group; or
(g) a substituted or an unsubstituted $C_1$ to $C_{20}$ alkyl group, $C_5$ to $C_{20}$ cycloalkyl group, or $C_6$-$C_{20}$ aromatic group; wherein any substituents are selected independently from a $C_1$ to $C_{10}$ hydrocarbyl group.

Aspect 59. The process for making a sustainable jet fuel according to Aspect 58, wherein $R^{1n}$ and $R^{2n}$, and/or $R^{3n}$ and $R^{4n}$ of the diphosphino aminyl moiety can be joined to form a ring containing a phosphorus atom of the diphosphino aminyl moiety.

Aspect 60. The process for making a sustainable jet fuel according to any of Aspects 58-59, wherein $R^{1n}$ and $R^{5n}$, or $R^{4n}$ and $R^{5n}$ of the diphosphino aminyl moiety can be joined to form a ring containing a phosphorus atom and the nitrogen atom of the diphosphino aminyl moiety.

Aspect 61. The process for making a sustainable jet fuel according to any of Aspects 44-49 and 52, wherein the heteroatomic ligand can be an $N^2$-phosphinyl formamidine compound having Structure NPF1, or an $N^2$-phosphinyl formamidine compound having Structure NPA1:

Structure NPF1

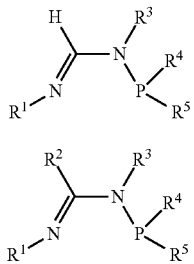

Structure NPA1 wherein $R^1$, $R^2$, $R^3$, $R^4$, and $R^5$ within Structure NPF1 and Structure NPFCr1 are independently:
(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;
(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or
(c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or
(e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

Aspect 62. The process for making a sustainable jet fuel according to any of Aspects 44-49, 52, and 61, wherein the chromium-containing compound is complexed to an $N^2$-phosphinyl formamidine compound or the chromium-containing compound is complexed to an $N^2$-phosphinyl amidine compound and has one of the following structures:

Structure NPFCr1

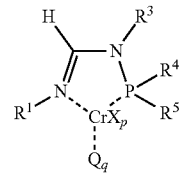

Structure NPACr1

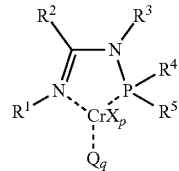

wherein X is an anionic ligand, and p is from 2 to 6, Q is a neutral ligand such as a nitrile ligand or an ether ligand, and q is from 0 to 6; and
wherein $R^1$, $R^2$, $R^3$, $R^4$, and $R^5$ within Structure NPF1 and Structure NPFCr1 are independently:
(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;
(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or
(c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to C₁₅ substituted phenyl group; or alternatively, a phenyl group or a C₆ to C₁₀ substituted phenyl group; or
(e) a benzyl group or a C₆ to C₃₀ substituted benzyl group; alternatively, a benzyl group or a C₆ to C₂₀ substituted benzyl group; alternatively, a benzyl group or a C₆ to C₁₅ substituted benzyl group; or alternatively, a benzyl group or a C₆ to C₁₀ substituted benzyl group.

Aspect 63. The process for making a sustainable jet fuel according to any of Aspects 61-62, wherein:
R¹ is a C₁ to C₁₅ alkyl group, a C₄ to C₂₀ cycloalkyl group, a C₄ to C₂₀ substituted cycloalkyl group, a C₆ to C₂₀ aryl group, or a C₆ to C₂₀ substituted aryl group;
R² is a C₁ to C₃₀ organyl group consisting essentially of inert functional groups wherein the inert functional groups are selected from halo groups, nitro groups, hydrocarboxy groups, sulfidyl groups, hydrocarbyl groups, or combinations thereof;
R³ is hydrogen,
R⁴ and R⁵ are each independently a C₁ to C₃₀ organyl group consisting essentially of inert functional groups wherein the inert functional groups are selected from halo groups, nitro groups, hydrocarboxy groups, sulfidyl groups, hydrocarbyl groups, or combinations thereof.

Aspect 64. The process for making a sustainable jet fuel according to any of Aspects 53-63, or any of the preceding Aspects, wherein any substituent of a substituted group is selected from:
(a) a halide, a hydrocarbyl group, or a hydrocarboxy group; alternatively, a halide or a hydrocarbyl group;
(b) a C₁ to C₁₀ hydrocarbyl group, or a C₁ to C₁₀ hydrocarboxy group; alternatively, a halide or a C₁ to C₁₀ hydrocarbyl group; alternatively, a halide or a C₁ to C₁₀ hydrocarboxy group; alternatively, a C₁ to C₁₀ hydrocarbyl group or a C₁ to C₁₀ hydrocarboxy group; alternatively, a halide; alternatively, a C₁ to C₁₀ hydrocarbyl group; or alternatively, a C₁ to C₁₀ hydrocarboxy group.

Aspect 65. The process for making a sustainable aviation fuel according to any of the preceding Aspects, wherein the first oligomerization catalyst system, the second oligomerization catalyst system, or both independently comprise an organoaluminum compound.

Aspect 66. The process for making a sustainable aviation fuel according to Aspect 65 or any preceding aspect, wherein the organoaluminum compound comprises, consists essentially of, or is selected from a triorganoaluminum compound, a diorganoaluminum halide, an organoaluminum dihalide, a diorganoaluminum alkoxide, an organoaluminum dialkoxide, an aluminoxane, or combinations thereof.

Aspect 67. The process for making a sustainable aviation fuel according to any of Aspects 65-66 or any preceding aspect, wherein the organoaluminum compound has a general formula Al(R¹⁰)ₙ(X¹¹)₃₋ₙ, wherein: n is from 1 to 3 inclusive; each R¹⁰ is independently a C₁ to C₂₀ hydrocarbyl; and X¹¹ is independently a halide, a hydride, a C₁ to C₂₀ hydrocarbyl, or a C₁ to C₂₀ hydrocarbyloxide.

Aspect 68. The process for making a sustainable aviation fuel according to any of Aspects 65-67 or any preceding aspect, wherein the organoaluminum compound comprises, consists of, consists essentially of, or is selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 69. The process for making a sustainable aviation fuel according to Aspect 65, wherein the organoaluminum compound comprises, consists of, consists essentially of, or is selected from an aluminoxane compound.

Aspect 70. The process for making a sustainable aviation fuel according to any of Aspects 65 and 69 or any preceding aspect, wherein the organoaluminum compound comprises, consists of, consists essentially of, or is selected from at least one aluminoxane compound, and wherein the aluminoxane comprises
a cyclic aluminoxane having the formula

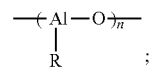

wherein R is a linear or branched alkyl having from 1 to 10 carbon atoms, and n is an integer from 3 to about 10;
a linear aluminoxane having the formula

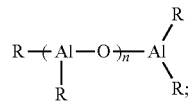

wherein R is a linear or branched alkyl having from 1 to 10 carbon atoms, and n is an integer from 1 to about 50;
a cage aluminoxane having the formula R$^t_{5m+α}$ R$^b_{m-α}$Al$_{4m}$O$_{3m}$, wherein m is 3 or 4 and α=n$_{Al(3)}$−n$_{O(2)}$+n$_{O(4)}$; wherein n$_{Al(3)}$ is the number of three coordinate aluminum atoms, n$_{O(2)}$ is the number of two coordinate oxygen atoms, n$_{O(4)}$ is the number of 4 coordinate oxygen atoms, R$^t$ represents a terminal alkyl group, and R$^b$ represents a bridging alkyl group; wherein R is a linear or branched alkyl having from 1 to 10 carbon atoms; or any combination thereof.

Aspect 71. The process for making a sustainable aviation fuel according to any of Aspects 65 and 69-70 or any preceding aspect, wherein the organoaluminum compound comprises, consists of, consists essentially of, or is selected from an aluminoxane having the formula

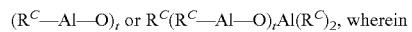

R$^C$ is a linear or branched C₁-C₆ alkyl such as methyl, ethyl, propyl, butyl, pentyl, or hexyl wherein t is an integer from 1 to 50, inclusive, or t is an integer from 2 to 20.

Aspect 72. The process for making a sustainable aviation fuel according to any of Aspects 65 and 69-71 or any preceding aspect, wherein the organoaluminum compound comprises, consists of, consists essentially of, or is selected from methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butyl-aluminoxane, sec-butylaluminoxane, iso-butylaluminoxane, t-butyl aluminoxane, 1-pentyl-aluminoxane, 2-pentylaluminoxane, 3-pentylaluminoxane, iso-pentylaluminoxane, neopentyl-aluminoxane, or combinations thereof.

Aspect 73. The process for making a sustainable jet fuel according to any of the preceding Aspects, wherein the reforming catalyst comprises an inorganic support, a Group 8-10 metal, and one or more halides such as fluorine, chlorine, iodine, bromine, or combinations thereof.

Aspect 74. The process for making a sustainable jet fuel according to any of the preceding Aspects, wherein the reforming catalyst comprises, consists essentially of, or is selected from:
(a) an inorganic support selected from a crystalline inorganic oxide or an amorphous inorganic oxide, or combinations thereof, and a Group 8-10 metal; or
(b) an inorganic support selected from a crystalline inorganic oxide or an amorphous inorganic oxide, a Group 8-10 metal, and one or more halides such as fluorine, chlorine, iodine, bromine, or combinations thereof.

Aspect 75. The process for making a sustainable jet fuel according to any of the preceding Aspects, wherein the reforming catalyst comprises an inorganic support comprising, consisting essentially of, or selected from a zeolite, a silica-bound zeolite, a clay mineral, silica, alumina, silica-alumina, aluminum phosphate, a heteropolytungstate, titania, zirconia, magnesia, boria, zinc oxide, mixed oxides thereof, or any combination thereof.

Aspect 76. The process for making a sustainable jet fuel according to any of the preceding Aspects, wherein the reforming catalyst comprises a zeolite.

Aspect 77. The process for making a sustainable jet fuel according to any of the preceding Aspects, wherein the reforming catalyst comprises L-zeolite, K/L-zeolite, X-zeolite, Y-zeolite, omega zeolite, beta zeolite, ZSM-4, ZSM-5, ZSM-10, ZSM-11, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, or combinations thereof.

Aspect 78. The process for making a sustainable jet fuel according to any of the preceding Aspects, wherein the reforming catalyst comprises a binder.

Aspect 79. The process for making a sustainable jet fuel according to any of the preceding Aspects, wherein the reforming catalyst comprises binder comprising, consisting essentially of, or selected from an inorganic solid oxide different from the inorganic support, a clay, or a combination thereof.

Aspect 80. The process for making a sustainable jet fuel according to any of the preceding Aspects, wherein the reforming catalyst comprises binder comprising, consisting essentially of, or selected from alumina, silica, magnesia, boria, titania, zirconia, a mixed oxide thereof, or a mixture thereof.

Aspect 81. The process for making a sustainable jet fuel according to any of the preceding Aspects, wherein the reforming catalyst comprises a binder in any weight percentage of binder disclosed herein, for example, from about 3 wt % to about 35 wt %, or from about 5 wt % to about 30 wt % binder, based on the total weight of the reforming catalyst.

Aspect 82. The process for making a sustainable jet fuel according to any of the preceding Aspects, wherein the reforming catalyst comprises an inorganic support comprising, consisting essentially of, or selected from a silica-bound or alumina-bound L-zeolite, barium ion-exchanged L-zeolite, or K/L-zeolite.

Aspect 83. The process for making a sustainable jet fuel according to any of the preceding Aspects, wherein the reforming catalyst comprises an inorganic support which is produced by a process comprising:
(a) combining the L-zeolite, barium ion-exchanged L-zeolite, or K/L-zeolite with a silica or alumina sol to form a mixture, extruding the mixture to form an extrudate,
(b) drying, and calcining the extrudate to form a bound support; and
(c) washing, drying, and calcining the bound support to form the inorganic support.

Aspect 84. The process for making a sustainable jet fuel according to any of the preceding Aspects, wherein the reforming catalyst comprises a Group 8-10 metal comprising, consisting essentially of, or selected from iron, cobalt, nickel, ruthenium, rhodium, palladium, osmium, iridium, platinum, or any combination thereof.

Aspect 85. The process for making a sustainable jet fuel according to any of the preceding Aspects, wherein the reforming catalyst comprises, consists essentially of, or is selected from platinum and L-zeolite.

Aspect 86. The process for making a sustainable jet fuel according to any of the preceding Aspects, wherein the reforming catalyst comprises any weight percentage of transition metal disclosed herein, for example, from about 0.5 wt % to about 2.5 wt %, from about 0.5 wt % to about 2 wt %, or from about 0.7 wt % to about 1.5 wt % transition metal.

Aspect 87. The process for making a sustainable jet fuel according to any of the preceding Aspects, wherein the reforming catalyst comprises platinum in a concentration of from about 0.3 wt % to about 1.5 wt % relative to the weight of the reforming catalyst prior to reduction.

Aspect 88. The process for making a sustainable jet fuel according to any of the preceding Aspects, wherein the reforming catalyst comprises an inorganic support, a Group 8-10 metal, and from about 0.7 wt % to about 6.0 wt % fluoride relative to the weight of the catalyst prior to reduction.

Aspect 89. The process for making a sustainable jet fuel according to any of the preceding Aspects, wherein the reforming catalyst comprises an inorganic support, a Group 8-10 metal, and from about 1.5 wt % to about 6.0 wt % chloride relative to the weight of the catalyst prior to reduction.

Aspect 90. The process for making a sustainable jet fuel according to any of the preceding Aspects, wherein the reforming catalyst comprises, consists essentially of, or is selected from a Honeywell UOP (Charlotte, North Carolina) R-234™ catalyst, R-254™ catalyst, R-264™ catalyst, R-334™ catalyst, R-364™ catalyst, R-464™ catalyst, or RMY-7™ catalyst.

Aspect 91. The process for making a sustainable jet fuel according to any of the preceding Aspects, wherein the first hydrogenation catalyst, the second hydrogenation catalyst, and the third hydrogenation catalyst independently comprise, consist essentially of, or are selected from a nickel or a nickel-containing hydrogenation catalyst, a platinum or a platinum-containing hydrogenation catalyst, or a palladium or a palladium-containing hydrogenation catalyst.

Aspect 92. The process for making a sustainable jet fuel according to any of the preceding Aspects, wherein the first hydrogenation catalyst, the second hydrogenation catalyst, and the third hydrogenation catalyst independently comprise, consist essentially of, or are selected from:
(a) a heterogeneous catalyst selected from a Group 8-12 metal deposited on a carrier selected from carbon, silica, alumina, silica-alumina, a zeolite, or calcium carbonate;
(b) a homogeneous catalysts selected from (i) a Ziegler catalysts comprising an organic salt of a Group 6-10 metal and an organoaluminum compound, or (ii) a coordination compound of Ru, Rh, or Ir, or (iii) a Group 4 metal organometallic compound.

Aspect 93. The process for making a sustainable jet fuel according to Aspect 92, wherein:

the Group 8-12 metal of the heterogeneous catalysts is selected from Fe, Co, Ni, Cu, Zn, Ru, Rh, Pd, Ir, or Pt;
the Group 6-10 metal of the homogeneous catalyst is selected from Ni, Co, Fe, or Cr; or
the Group 4 metal organometallic compound is selected from a Group 4 metallocene compound.

Aspect 94. The process for making a sustainable jet fuel according to any of the preceding Aspects, wherein the first hydrogenation catalyst, the second hydrogenation catalyst, and the third hydrogenation catalyst independently comprise, consist essentially of, or are selected from one or more metals selected from cobalt, molybdenum, nickel or tungsten.

Aspect 95. The process for making a sustainable jet fuel according to any of the preceding Aspects, wherein the first oligomerization catalyst system or the second oligomerization catalyst system, independently, comprises a diluent.

Aspect 96. The process for making a sustainable jet fuel according to Aspect 95, wherein the diluent comprises, consists essentially of, or is selected from a hydrocarbon, a halogenated hydrocarbon, or combinations thereof.

Aspect 97. The process for making a sustainable jet fuel according to any of Aspects 95-96, wherein the diluent comprises, consists essentially of, or is selected from a aliphatic hydrocarbons, aromatic hydrocarbons, petroleum distillates, halogenated aliphatic hydrocarbons, halogenated aromatic hydrocarbons, or combinations thereof.

Aspect 98. The process for making a sustainable jet fuel according to any of Aspects 95-97, wherein the diluent comprises, consists essentially of, or is selected from a $C_3$ to $C_8$ linear or branched acyclic aliphatic hydrocarbon, $C_6$ to $C_{10}$ aromatic hydrocarbons, $C_1$ to $C_{15}$ halogenated aliphatic hydrocarbons, $C_1$ to $C_{10}$ halogenated aliphatic hydrocarbons, $C_1$ to $C_5$ halogenated aliphatic hydrocarbons, $C_6$ to $C_{20}$ halogenated aromatic hydrocarbons, $C_6$ to $C_{10}$ halogenated aromatic hydrocarbons, or combinations thereof.

Aspect 99. The process for making a sustainable jet fuel according to any of Aspects 95-98, wherein the diluent comprises, consists essentially of, or is selected from a propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), cyclohexane, methyl cyclohexane, benzene, toluene, xylene (including ortho-xylene, meta-xylene, para-xylene, or mixtures thereof), ethylbenzene, methylene chloride, chloroform, carbon tetrachloride, dichloroethane, trichloroethane, chlorobenzene, dichlorobenzene, or combinations thereof.

Aspect 100. The process for making a sustainable jet fuel according to any of the preceding Aspects, wherein the biomass ethanol is produced from a starch-based feedstock, a sugar-based feedstock, or a cellulosic feedstock.

Aspect 101. The process for making a sustainable jet fuel according to any of the preceding Aspects, wherein the biomass ethanol is produced from a bio-synthetic natural gas (bio-SNG) to ethanol process.

Aspect 102. The process for making a sustainable jet fuel according to any of the preceding Aspects, wherein the step of providing a bio-ethylene feed comprises:

[1](A) converting a starch-based feedstock, a sugar-based feedstock, or a cellulosic feedstock to a biomass ethanol, or (B) converting a cellulosic feedstock to bio-syngas ethanol; and
[2] dehydrating the biomass ethanol or the bio-syngas ethanol to provide the bio-ethylene feed.

Aspect 103. The process for making a sustainable jet fuel according to any of the preceding Aspects, wherein all of or a portion of the bio-ethylene feed is derived from the dehydration of biomass ethanol.

Aspect 104. The process for making a sustainable jet fuel according to any of the preceding Aspects, wherein a portion of the bio-ethylene feed is derived from the dehydration of bio-syngas ethanol.

Aspect 105. The process for making a sustainable jet fuel according to any of the preceding Aspects, wherein the bio-syngas ethanol is produced by a gasification of cellulosic biomass.

Aspect 106. The process for making a sustainable jet fuel according to any of the preceding Aspects, wherein the biomass ethanol is produced by the fermentation of sugars derived from a starch-based feedstock or a sugar-based feedstock.

Aspect 107. The process for making a sustainable jet fuel according to any of the preceding Aspects, wherein the biomass ethanol is produced by the fermentation of a carbohydrate derived from a starch-based feedstock, a sugar-based feedstock, or a cellulosic feedstock.

Aspect 108. The process for making a sustainable jet fuel according to any of Aspects 100-107, wherein the starch-based feedstock comprises barley, cassava root, corn, potato, rice, sorghum grain, sweet potato, wheat, rye, or any combination thereof.

Aspect 109. The process for making a sustainable jet fuel according to any of Aspects 100-108, wherein the sugar-based feedstock comprises sugar cane, sugar beet, sweet sorghum, molasses, fruit, or any combination thereof.

Aspect 110. The process for making a sustainable jet fuel according to any of Aspects 100-109, wherein the biomass ethanol is produced from a starch-based feedstock by a process comprising the enzymatic hydrolysis of the starch-based feedstock to produce sugars, followed by yeast fermentation of the sugars.

Aspect 111. The process for making a sustainable jet fuel according to any of Aspects 100-109, wherein the biomass ethanol is produced from the cellulosic feedstock.

Aspect 112. The process for making a sustainable jet fuel according to any of Aspects 100-111, wherein the cellulosic feedstock comprises corn stover, wheat straw, sugar cane bagasse, switchgrass, or wood chips.

Aspect 113. The process for making a sustainable jet fuel according to any of the preceding Aspects, wherein dehydration of the biomass ethanol comprising contacting the biomass ethanol with a dehydration catalyst under conditions suitable to form bio-ethylene.

Aspect 114. The process for making a sustainable jet fuel according to Aspect 113, wherein dehydration of the biomass ethanol comprises passing liquid phase ethanol through a bed comprising the dehydration catalyst.

Aspect 115. The process for making a sustainable jet fuel according to any of Aspects 113-114, further comprising regenerating the dehydration catalyst by heating at atmosphere pressure or at reduced pressure.

Aspect 116. The process for making a sustainable jet fuel according to any of Aspects 113-115, wherein the dehydration catalyst comprises, consists essentially of, or is alumina, silica gel, silica-alumina, a crystalline silicate, a dealuminated crystalline silicate, a phosphorus-modified crystalline silicate, a zeolite, a molecular sieve, or anhydrous calcium sulfate.

Aspect 117. The process for making a sustainable jet fuel according to any of Aspects 113-116, wherein the dehydration catalyst comprises, consists essentially of, or is a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst.

Aspect 118. The process for making a sustainable jet fuel according to any of the preceding Aspects, wherein the contacting the bio-ethylene feed with the first oligomerization catalyst system or the second oligomerization catalyst system, independently, occurs at a total pressure of from 0 psig (0 KPa) to 2,500 psig (17.3 MPa), from 0 psig (0 KPa) to 1,600 psig (11.0 MPa), from 50 psig (344 KPa) to 2,500 psig (17.3 MPa); or from 300 psig (2.0 MPa) to 900 psig (6.2 MPa).

Aspect 119. The process for making a sustainable jet fuel according to any of the preceding Aspects, wherein the contacting the bio-ethylene feed with the first oligomerization catalyst system or the second oligomerization catalyst system, independently, occurs at a total bio-ethylene pressure of from 50 psig (344 KPa) to 2,500 psig (17.3 MPa); or from 300 psig (2.0 MPa) to 900 psig (6.2 MPa).

Aspect 120. The process for making a sustainable jet fuel according to any of the preceding Aspects, wherein the contacting the bio-ethylene feed with the first oligomerization catalyst system or the second oligomerization catalyst system, independently, occurs at a temperature within a range of from 0° C. to 180° C., from 10° C. to 160° C., from 20° C. to 140° C., from 30° C. to 120° C.; from 40° C. to 100° C.; or from 50° C. to 100° C.

What is claimed is:

1. A process for making a sustainable jet fuel, the process comprising:
   (a) providing a bio-ethylene feed, at least a portion of which is derived from a biomass ethanol or a bio-syngas ethanol;
   (b) contacting the bio-ethylene feed with a first oligomerization catalyst system to form a first oligomerization product comprising at least one $C_4$ to $C_{16}$ alpha-olefin;
   (c) contacting a first portion of the first oligomerization product with a second oligomerization catalyst system to provide a second oligomerization product comprising $C_{16}$-olefins;
   (d) separating a second portion of the first oligomerization product prior to contacting the first portion of the first oligomerization product with the second oligomerization catalyst system;
   (e) combining the second portion of the first oligomerization product from step (d) with the second oligomerization product from step (c) to form a mixture; and
   (f) hydrogenating the mixture of the second portion of the first oligomerization product and the second oligomerization product in the presence of a first hydrogenation catalyst to provide a first $C_{16}$-paraffin stream.

2. The process for making a sustainable jet fuel according to claim 1, further comprising using the first $C_{16}$-paraffin stream as a component to form the sustainable jet fuel.

3. The process for making a sustainable jet fuel according to claim 1, wherein the at least one $C_4$ to $C_{16}$ alpha-olefin comprises $C_4$ to $C_{14}$ alpha-olefins, $C_6$ to $C_8$ alpha-olefins, $C_6$ plus $C_{10}$ alpha-olefins, $C_6$ to $C_{10}$ alpha-olefins, or any combination thereof.

4. The process for making a sustainable jet fuel according to claim 1, wherein the steps of contacting the bio-ethylene feed with the first oligomerization catalyst system and contacting the first oligomerization product with the second oligomerization catalyst system are carried out in the same reactor.

5. The process for making a sustainable jet fuel according to claim 1, wherein the steps of contacting the bio-ethylene feed with the first oligomerization catalyst system and contacting the first oligomerization product with the second oligomerization catalyst system are carried out in different reactors.

6. The process for making a sustainable jet fuel according to claim 1, further comprising:
   certifying the sustainable jet fuel as compliant with the Carbon Offsetting and Reduction Scheme for International Jet (CORSIA) sustainability criteria in accordance with the International Sustainability and Carbon Certification (ISCC) CORSIA certification system;
   wherein the step of certifying is based upon the weight or fraction of the sustainable jet fuel attributable to the biomass ethanol determined by mass balance and the free attribution method.

7. The process for making a sustainable jet fuel according to claim 1, further comprising:
   certifying the sustainable jet fuel as a Lower Carbon Jet Fuel (LCAF) in accordance with the International Sustainability and Carbon Certification (ISCC) LCAF certification system;
   wherein the step of certifying is based upon the weight or fraction of the sustainable jet fuel attributable to the biomass ethanol determined by mass balance and the free attribution method.

8. The process for making a sustainable jet fuel according to claim 1, wherein the first oligomerization catalyst system and the second oligomerization catalyst system, independently, comprise a chromium-based catalyst, a metallocene-based catalyst, a Ziegler-Natta based catalyst, tungstated zirconium, molybdenum zirconium, nickel and/or cobalt doped tungstated zirconium, nickel and/or cobalt doped molybdenum zirconium catalysts, a Group 3 to Group 12 metal-treated zeolite, molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof.

9. The process for making a sustainable jet fuel according to claim 8, wherein the first oligomerization catalyst system and the second oligomerization catalyst system, independently, further comprise an organoaluminum compound, an organoaluminoxane, an organoboron compound, an organozinc compound, an organomagnesium compound, an organolithium compound, or any combination thereof.

10. The process for making a sustainable jet fuel according to claim 1, wherein the first oligomerization catalyst system and the second oligomerization catalyst system, independently, comprise a chromium-based catalyst, and the chromium-based catalyst comprises (a) a chromium-containing compound, (b) a heteroatomic ligand, and (c) optionally, a diluent;
   wherein the heteroatomic ligand is a separate component of the first oligomerization catalyst system or the second oligomerization catalyst system or is a ligand complexed to the chromium-containing compound of the first oligomerization catalyst system or the second oligomerization catalyst system.

11. The process for making a sustainable jet fuel according to claim 1, wherein the bio-ethylene feed is derived from the dehydration of the biomass ethanol or the bio-syngas ethanol in the presence of a dehydration catalyst under conditions suitable to form bio-ethylene, and the dehydration catalyst comprises:
(a) alumina, silica gel, silica-alumina, a crystalline silicate, a dealuminated crystalline silicate, a phosphorus-modified crystalline silicate, a zeolite, a molecular sieve, or anhydrous calcium sulfate; or
(b) a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst.

12. The process for making a sustainable jet fuel according to claim 1, wherein the first hydrogenation catalyst comprises:
(a) a heterogeneous catalyst selected from a Group 8-12 metal deposited on a carrier selected from carbon, silica, alumina, silica-alumina, a zeolite, or calcium carbonate; or
(b) a homogeneous catalyst selected from (i) a Ziegler catalyst comprising an organic salt of a Group 6-10 metal and an organoaluminum compound, or (ii) a coordination compound of Ru, Rh, or Ir, or (iii) a Group 4 metal organometallic compound;
wherein (i) the Group 8-12 metal of the heterogeneous catalyst is selected from Fe, Co, Ni, Cu, Zn, Ru, Rh, Pd, Ir, or Pt; (ii) the Group 6-10 metal of the homogeneous catalyst is selected from Ni, Co, Fe, or Cr; or (iii) the Group 4 metal organometallic compound is selected from a Group 4 metallocene compound.

13. The process for making a sustainable jet fuel according to claim 1, wherein:
contacting the bio-ethylene feed with the first oligomerization catalyst system occurs at a total bio-ethylene pressure of from 50 psig (344 KPa) to 2,500 psig (17.3 MPa);
contacting the first oligomerization product with the second oligomerization catalyst system occurs at a total pressure of from 0 psig (0 KPa) to 2,500 psig (17.3 MPa); and
contacting the bio-ethylene feed with the first oligomerization catalyst system and contacting the first oligomerization product with the second oligomerization catalyst system occur at a temperature selected independently within a range of from 0° C. to 180° C.

14. A process for making a sustainable jet fuel, the process comprising:
(a) providing a bio-ethylene feed, at least a portion of which is derived from a biomass ethanol or a bio-syngas ethanol;
(b) contacting the bio-ethylene feed with a first oligomerization catalyst system to form a first oligomerization product comprising at least one $C_4$ to $C_{16}$ alpha-olefin;
(c) contacting a first portion of the first oligomerization product with a second oligomerization catalyst system to provide a second oligomerization product comprising $C_{16}$-olefins;
(d) hydrogenating the second oligomerization product in the presence of a first hydrogenation catalyst to provide a first $C_{16}$-paraffin stream;
(e) separating a $C_6$ to $C_8$ aliphatic hydrocarbon stream comprising at least one $C_6$ to $C_8$ alpha-olefin and/or $C_6$ to $C_8$ paraffin from the first oligomerization product;
(f) contacting the $C_6$ to $C_8$ aliphatic hydrocarbon stream with a reforming catalyst to provide a $C_6$ to $C_8$ aromatic hydrocarbon stream; and
(g) hydrogenating at least a portion of the $C_6$ to $C_8$ aromatic hydrocarbon stream in the presence of a third hydrogenation catalyst to form a $C_6$ to $C_8$ cycloparaffin stream.

15. The process for making a sustainable jet fuel according to claim 14, further comprising:
(h) using the $C_6$ to $C_8$ cycloparaffin stream, the $C_6$ to $C_8$ aromatic hydrocarbon stream, or both as components to form the sustainable jet fuel.

16. The process for making a sustainable jet fuel according to claim 14, wherein:
step (e) of separating the $C_6$ to $C_8$ aliphatic hydrocarbon stream from the first oligomerization product provides an alpha-olefin raffinate comprising at least one $C_4$ and $C_{10}$-$C_{16}$ alpha-olefin; and
step (c) of contacting the first portion of the first oligomerization product with the second oligomerization catalyst system comprises contacting the alpha-olefin raffinate with the second oligomerization catalyst system to provide the second oligomerization product comprising $C_{16}$-olefins.

17. The process for making a sustainable jet fuel according to claim 14, wherein the reforming catalyst comprises:
(a) an inorganic support selected from a crystalline inorganic oxide or an amorphous inorganic oxide, and a Group 8-10 metal; or
(b) an inorganic support selected from a crystalline inorganic oxide or an amorphous inorganic oxide, a Group 8-10 metal, and one or more of fluoride, chloride, bromide, or iodide.

18. The process for making a sustainable jet fuel according to claim 14, wherein the reforming catalyst comprises an inorganic support, which is selected from a zeolite, a silica-bound zeolite, a clay mineral, silica, alumina, silica-alumina, aluminum phosphate, a heteropolytungstate, titania, zirconia, magnesia, boria, zinc oxide, mixed oxides thereof, or any combination thereof.

19. The process for making a sustainable jet fuel according to claim 14, wherein the reforming catalyst comprises L-zeolite, K/L-zeolite, X-zeolite, Y-zeolite, omega zeolite, beta zeolite, ZSM-4, ZSM-5, ZSM-10, ZSM-11, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, or combinations thereof.

20. The process for making a sustainable jet fuel according to claim 17, wherein the reforming catalyst comprises a binder selected from an inorganic solid oxide different from the inorganic support, a clay, or a combination thereof, and the binder is present in a concentration of from about 3 wt % to about 35 wt %, based on the total weight of the reforming catalyst.

21. The process for making a sustainable jet fuel according to claim 14, wherein the reforming catalyst comprises a Group 8-10 metal selected from iron, cobalt, nickel, ruthenium, rhodium, palladium, osmium, iridium, platinum, or any combination thereof.

22. The process for making a sustainable jet fuel according to claim 14, wherein the reforming catalyst comprises platinum and L-zeolite, and wherein:
the platinum is present in the reforming catalyst from about 0.5 wt % to about 2.5 wt %;
the reforming catalyst comprises either (a) from about 0.7 wt % to about 6.0 wt % fluoride relative to the weight of the catalyst prior to reduction; or (b) from about 1.5 wt % to about 6.0 wt % chloride relative to the weight of the catalyst prior to reduction.

23. The process for making a sustainable jet fuel according to claim 14, further comprising:
separating a second portion of the first oligomerization product prior to contacting the first portion of the first oligomerization product with the second oligomerization catalyst system.

24. The process for making a sustainable jet fuel according to claim 14, wherein the at least one $C_4$ to $C_{16}$ alpha-olefin comprises $C_4$ to $C_{14}$ alpha-olefins, $C_6$ to $C_8$ alpha-olefins, $C_6$ plus $C_{10}$ alpha-olefins, $C_6$ to $C_{10}$ alpha-olefins, or any combination thereof.

25. The process for making a sustainable jet fuel according to claim 24, further comprising using the first $C_{16}$-paraffin stream as a component to form the sustainable jet fuel.

26. The process for making a sustainable jet fuel according to claim 25, wherein the steps of contacting the bio-ethylene feed with the first oligomerization catalyst system and contacting the first oligomerization product with the second oligomerization catalyst system are carried out in the same reactor.

27. The process for making a sustainable jet fuel according to claim 25, wherein the steps of contacting the bio-ethylene feed with the first oligomerization catalyst system and contacting the first oligomerization product with the second oligomerization catalyst system are carried out in different reactors.

28. A process for making a sustainable jet fuel, the process comprising:
(i) providing a bio-ethylene feed, at least a portion of which is derived from a biomass ethanol or a bio-syngas ethanol;
(ii) contacting the bio-ethylene feed with a first oligomerization catalyst system to form a first oligomerization product comprising at least one $C_4$ to $C_{16}$ alpha-olefin;
(iii) contacting a first portion of the first oligomerization product with a second oligomerization catalyst system to provide a second oligomerization product comprising $C_{16}$-olefins; and
(iv) hydrogenating the second oligomerization product in the presence of a first hydrogenation catalyst to provide a first $C_{16}$-paraffin stream;
wherein the first oligomerization catalyst system and the second oligomerization catalyst system, independently, comprise:
(a) a chromium-containing compound, a pyrrole compound, an organoaluminum compound, and optionally a halide containing compound;
(b) a chromium-containing compound, a diphosphino aminyl compound, an organoaluminum compound;
(c) a chromium-containing compound complexed to a diphosphino aminyl compound, and an organoaluminum compound;
(d) a chromium-containing compound, an $N^2$-phosphinyl amidine compound, and an organoaluminum compound;
(e) a chromium-containing compound complexed to an $N^2$-phosphinyl amidine compound, and an organoaluminum compound;
(f) a chromium-containing compound, an $N^2$-phosphinyl formamidine compound, an organoaluminum compound;
(g) a chromium-containing compound complexed to an $N^2$-phosphinyl formamidine compound, and an organoaluminum compound; or
(h) any combinations thereof.

29. The process for making a sustainable jet fuel according to claim 28, wherein the pyrrole compound has the structure of Formula P1 or Formula I1:

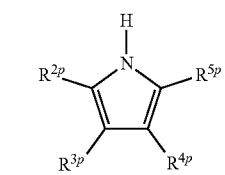

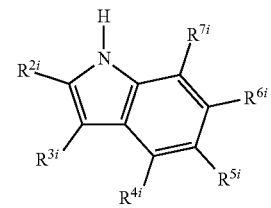

wherein: $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 are independently:
hydrogen, a $C_1$ to $C_{18}$ organyl group, a $C_1$ to $C_{18}$ hydrocarbyl group, or a $C_3$ to $C_{60}$ silyl group.

30. The process for making a sustainable jet fuel according to claim 28, wherein the diphosphino aminyl compound has the Structure PNP2:

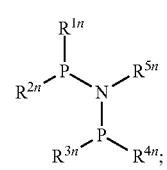

wherein $R^{1n}$, $R^{2n}$, $R^{3n}$, $R^{4n}$, and $R^{5n}$ independently are: a $C_1$ to $C_{30}$ organyl group; a $C_1$ to $C_{30}$ organyl group comprising inert functional groups; a $C_1$ to $C_{30}$ hydrocarbyl group; a $C_1$ to $C_{30}$ alkyl group; a $C_6$ to $C_{30}$ aromatic group; a phenyl group or a $C_6$ to $C_{30}$ substituted phenyl group; or a substituted or an unsubstituted $C_1$ to $C_{20}$ alkyl group, $C_5$ to $C_{20}$ cycloalkyl group, or $C_6$-$C_{20}$ aromatic group;
wherein any substituents are selected independently from a $C_1$ to $C_{10}$ hydrocarbyl group.

31. The process for making a sustainable jet fuel according to claim 30, wherein:
$R^{1n}$ and $R^{2n}$, and/or $R^{3n}$ and $R^{4n}$ of the diphosphino aminyl compound are joined to form a ring containing a phosphorus atom of the diphosphino aminyl compound; or R$^{1n}$ and R$^{5n}$, or R$^{4n}$ and R$^{5n}$ of the diphosphino aminyl compound are joined to form a ring containing a phosphorus atom and the nitrogen atom of the diphosphino aminyl compound.

32. The process for making a sustainable jet fuel according to claim 28, wherein the N$^2$-phosphinyl formamidine compound has Structure NPF1 or the N$^2$-phosphinyl formamidine compound has Structure NPA1:

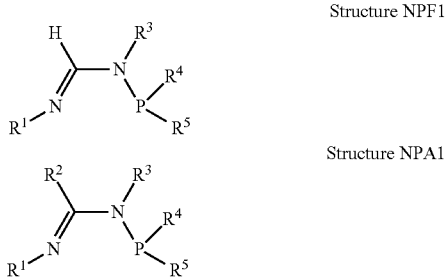

Structure NPF1

Structure NPA1 wherein R$^1$, R$^2$, R$^3$, R$^4$, and R$^5$ are independently: a C$_1$ to C$_{30}$ organyl group, a C$_1$ to C$_{30}$ organyl group consisting essentially of inert functional groups; a C$_1$ to C$_{30}$ hydrocarbyl group; a C$_1$ to C$_{30}$ alkyl group; a C$_6$ to C$_{30}$ aromatic group; a phenyl group or a C$_6$ to C$_{30}$ substituted phenyl group; or a benzyl group or a C$_6$ to C$_{30}$ substituted benzyl group.

33. The process for making a sustainable jet fuel according to claim 28, wherein the chromium-containing compound is selected from:

chromium(II) nitrate, chromium(II) sulfate, chromium(II) fluoride, chromium(II) chloride, chromium(II) bromide, or chromium(II) iodide, chromium(III) nitrate, chromium(III) sulfate, chromium(III) fluoride, chromium(III) chloride, chromium(III) bromide, chromium(III) iodide, a chromium(II) carboxylate, a chromium(II) alkoxide, a chromium(II) aryloxide, a chromium(II) beta-dionate, a chromium(III) carboxylate, a chromium(III) alkoxide, a chromium(III) aryloxide, or a chromium(III) beta-dionate;

wherein each carboxylate group of the chromium(II) carboxylate and the chromium(III) carboxylate is independently selected from acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate).

34. The process for making a sustainable jet fuel according to claim 28, wherein organoaluminum compound comprises a triorganoaluminum compound, a diorganoaluminum halide, an organoaluminum dihalide, a diorganoaluminum alkoxide, an organoaluminum dialkoxide, an aluminoxane, or combinations thereof.

35. The process for making a sustainable aviation fuel according to claim 28, wherein the organoaluminum compound has a general formula Al(R$^{10}$)$_n$(X$^{11}$)$_{3-n}$, wherein: n is from 1 to 3 inclusive; each R$^{10}$ is independently a C$_1$ to C$_{20}$ hydrocarbyl; and X$^{11}$ is independently a halide, a hydride, a C$_1$ to C$_{20}$ hydrocarbyl, or a C$_1$ to C$_{20}$ hydrocarbyloxide.

36. The process for making a sustainable jet fuel according to claim 28, wherein:

the at least one C$_4$ to C$_{16}$ alpha-olefin comprises C$_4$ to C$_{14}$ alpha-olefins, C$_6$ to C$_8$ alpha-olefins, C$_6$ plus C$_{10}$ alpha-olefins, C$_6$ to C$_{10}$ alpha-olefins, or any combination thereof, and the process further comprises using the first C$_{16}$-paraffin stream as a component to form the sustainable jet fuel.

* * * * *